United States Patent
Rich et al.

(10) Patent No.: US 10,859,851 B2
(45) Date of Patent: Dec. 8, 2020

(54) OPTICAL PRODUCTS, MASTERS FOR FABRICATING OPTICAL PRODUCTS, AND METHODS FOR MANUFACTURING MASTERS AND OPTICAL PRODUCTS

(71) Applicant: Wavefront Technology, Inc., Paramount, CA (US)

(72) Inventors: Christopher Chapman Rich, Rancho Palos Verdes, CA (US); Phillip Christopher Harvey, Long Beach, CA (US); Joel Mikael Petersen, Valley Village, CA (US)

(73) Assignee: WAVEFRONT TECHNOLOGY, INC., Paramount, CA (US)

( * ) Notice: Subject to any disclaimer, the term of this patent is extended or adjusted under 35 U.S.C. 154(b) by 127 days.

(21) Appl. No.: 14/921,933

(22) Filed: Oct. 23, 2015

(65) Prior Publication Data
US 2016/0147076 A1  May 26, 2016

Related U.S. Application Data

(60) Provisional application No. 62/068,540, filed on Oct. 24, 2014.

(51) Int. Cl.
*G02B 27/22* (2018.01)
*G02B 30/40* (2020.01)
(Continued)

(52) U.S. Cl.
CPC ............. *G02B 30/40* (2020.01); *B42D 25/29* (2014.10); *B42D 25/324* (2014.10);
(Continued)

(58) Field of Classification Search
CPC .... G02B 27/22; G02B 27/2221; G02B 5/045; G03H 1/0011; B42D 25/00; B42D 25/29;
(Continued)

(56) References Cited

U.S. PATENT DOCUMENTS

| 4,124,947 A | 11/1978 | Kuhl et al. |
| 4,186,943 A | 2/1980 | Lee |
| (Continued) | | |

FOREIGN PATENT DOCUMENTS

| AU | 2014250638 | 11/2014 |
| AU | 2014250641 | 11/2014 |
| (Continued) | | |

OTHER PUBLICATIONS

Extended European Search Report received in EP Application No. 15853476.8, dated Apr. 30, 2018 in 9 pages.
(Continued)

*Primary Examiner* — Stephone B Allen
*Assistant Examiner* — Jyotsna V Dabbi
(74) *Attorney, Agent, or Firm* — Knobbe, Martens, Olson & Bear, LLP

(57) ABSTRACT

An optical product can be configured to be an anti-counterfeit feature such as a patch, a window, or a thread on a banknote. The optical product can be configured, when illuminated, to reproduce by reflected or refracted light, a 3D image of at least a part of a 3D object. The optical product can include a first surface and a second surface opposite the first surface. The second surface can include a plurality of portions. Each portion can correspond to a point on a surface of the 3D object. Each portion can include features corresponding to non-holographic elements on the optical product. A gradient in the features can correlate to an inclination of the surface of the 3D object at the corresponding point. An orientation of the features can correlate to an orientation of the surface of the 3D object at the corresponding point.

38 Claims, 12 Drawing Sheets

(51) Int. Cl.
  *B42D 25/328* (2014.01)
  *G02B 5/04* (2006.01)
  *B42D 25/29* (2014.01)
  *B42D 25/324* (2014.01)
  *G03H 1/00* (2006.01)

(52) U.S. Cl.
  CPC ............ *B42D 25/328* (2014.10); *G02B 5/045* (2013.01); *G03H 1/0011* (2013.01)

(58) Field of Classification Search
  CPC .... B42D 25/324; B42D 25/328; B42D 25/44; B42D 25/435; B42D 25/30; B42D 25/21; B42D 25/355; B42D 25/351; B42D 25/373; B42D 25/378
  USPC ........................................................ 359/478
  See application file for complete search history.

(56) References Cited

U.S. PATENT DOCUMENTS

| | | | |
|---|---|---|---|
| 4,417,784 A | 11/1983 | Knop et al. | |
| 4,534,398 A | 8/1985 | Crane | |
| 4,681,451 A | 7/1987 | Guerra et al. | |
| 4,892,336 A | 1/1990 | Kaule et al. | |
| 5,105,306 A | 4/1992 | Ohala | |
| 5,276,478 A | 1/1994 | Morton | |
| 5,291,317 A | 3/1994 | Newswanger | |
| 5,600,486 A | 2/1997 | Gal et al. | |
| 5,689,340 A | 11/1997 | Young | |
| 5,699,190 A | 12/1997 | Young et al. | |
| 6,351,334 B1 | 2/2002 | Hsieh et al. | |
| 6,410,213 B1 | 6/2002 | Raguin et al. | |
| 6,424,467 B1 | 7/2002 | Goggins | |
| 6,817,530 B2 | 11/2004 | Labrec et al. | |
| 7,047,883 B2 | 5/2006 | Raksha et al. | |
| 7,333,268 B2 | 2/2008 | Steenblik et al. | |
| 7,551,335 B2 | 6/2009 | Schilling et al. | |
| 7,729,026 B2 | 6/2010 | Argoitia et al. | |
| 8,009,360 B2 | 8/2011 | Steenblik et al. | |
| 8,025,239 B2 | 9/2011 | Labrec et al. | |
| 8,077,393 B2 | 12/2011 | Steenblik et al. | |
| 8,111,462 B2 | 2/2012 | Steenblik et al. | |
| 8,120,855 B2 | 2/2012 | Steenblik et al. | |
| 8,144,399 B2 | 3/2012 | Steenblik et al. | |
| 8,254,030 B2 | 8/2012 | Steenblik et al. | |
| 8,284,492 B2 | 10/2012 | Crane et al. | |
| 8,310,760 B2 | 11/2012 | Steenblik et al. | |
| 8,739,711 B2 | 6/2014 | Cote | |
| 8,755,121 B2 | 6/2014 | Cape et al. | |
| 8,773,763 B2 | 7/2014 | Steenblik et al. | |
| 8,861,055 B2 | 10/2014 | Holmes et al. | |
| 8,867,134 B2 | 10/2014 | Steenblik et al. | |
| 8,964,296 B2 | 2/2015 | Hoffmuller et al. | |
| 8,982,231 B2 | 3/2015 | Vincent | |
| 9,016,726 B2 | 4/2015 | Rauch et al. | |
| 9,132,690 B2 | 9/2015 | Raymond et al. | |
| 9,827,802 B2 | 11/2017 | Fuhse et al. | |
| 10,252,563 B2 | 4/2019 | Rich et al. | |
| 2003/0179364 A1 | 9/2003 | Steenblik et al. | |
| 2003/0183695 A1 | 10/2003 | Labrec et al. | |
| 2004/0240777 A1 | 12/2004 | Woodgate et al. | |
| 2005/0180020 A1* | 8/2005 | Steenblik ................. B44F 1/06 359/626 |
| 2006/0056065 A1 | 3/2006 | Schilling et al. | |
| 2007/0273143 A1 | 11/2007 | Crane et al. | |
| 2008/0036196 A1 | 2/2008 | Steenblik et al. | |
| 2008/0037131 A1 | 2/2008 | Steenblik et al. | |
| 2008/0165423 A1 | 7/2008 | Steenblik et al. | |
| 2008/0166505 A1 | 7/2008 | Huang et al. | |
| 2008/0212192 A1 | 9/2008 | Steenblik et al. | |
| 2008/0212193 A1 | 9/2008 | Steenblik et al. | |
| 2008/0258456 A1 | 10/2008 | Rahm et al. | |
| 2008/0309063 A1 | 12/2008 | Zintzmeyer | |
| 2009/0021840 A1 | 1/2009 | Steenblik et al. | |
| 2009/0034082 A1 | 2/2009 | Commander et al. | |
| 2009/0102179 A1 | 4/2009 | Lo | |
| 2009/0122412 A1 | 5/2009 | Steenblik et al. | |
| 2010/0172000 A1 | 7/2010 | Holmes | |
| 2010/0246019 A1 | 9/2010 | Booyens et al. | |
| 2010/0308571 A1 | 12/2010 | Steenblik et al. | |
| 2011/0019283 A1 | 1/2011 | Steenblik et al. | |
| 2011/0209328 A1 | 9/2011 | Steenblik et al. | |
| 2012/0099199 A1 | 4/2012 | Vasylyev | |
| 2012/0170124 A1 | 7/2012 | Fuhse et al. | |
| 2012/0237675 A1 | 9/2012 | Sharp et al. | |
| 2012/0319395 A1 | 12/2012 | Fuhse et al. | |
| 2013/0052373 A1 | 2/2013 | Noiset et al. | |
| 2013/0093172 A1* | 4/2013 | Fuhse .................... B42D 15/00 283/67 |
| 2013/0099474 A1 | 4/2013 | Fuhse et al. | |
| 2013/0106092 A1 | 5/2013 | Holmes | |
| 2013/0182300 A1 | 7/2013 | Müller et al. | |
| 2013/0193679 A1 | 8/2013 | Fuhse et al. | |
| 2013/0270813 A1 | 10/2013 | Hoffmuller et al. | |
| 2014/0151996 A1 | 6/2014 | Camus | |
| 2014/0160568 A1 | 6/2014 | Fuhse | |
| 2014/0177008 A1 | 6/2014 | Raymond et al. | |
| 2014/0184599 A1 | 7/2014 | Quilot et al. | |
| 2014/0191500 A1 | 7/2014 | Holmes | |
| 2014/0268332 A1 | 9/2014 | Guo et al. | |
| 2014/0346766 A1* | 11/2014 | Walter .................... G02B 5/286 283/81 |
| 2015/0084324 A1 | 3/2015 | Spehar | |
| 2015/0198924 A1 | 7/2015 | Woida-O'Brien | |
| 2015/0213666 A1 | 7/2015 | Schiffmann et al. | |
| 2015/0258838 A1 | 9/2015 | Fuhse | |
| 2015/0352884 A1 | 12/2015 | Fuhse et al. | |
| 2016/0023495 A1 | 1/2016 | Fuhse et al. | |
| 2016/0075166 A1 | 3/2016 | Ritter et al. | |
| 2016/0176221 A1 | 6/2016 | Holmes | |
| 2017/0129272 A1 | 5/2017 | Rich et al. | |
| 2018/0001692 A1 | 1/2018 | Rich et al. | |
| 2019/0236887 A1 | 8/2019 | Rich et al. | |
| 2020/0039279 A1 | 2/2020 | Rich et al. | |

FOREIGN PATENT DOCUMENTS

| | | |
|---|---|---|
| DE | 10 2015 015 991 | 6/2017 |
| EP | 0 323 108 | 7/1989 |
| EP | 2 338 692 | 6/2011 |
| EP | 2 365 374 | 9/2011 |
| EP | 2 365 375 | 9/2011 |
| EP | 2 365 378 | 9/2011 |
| EP | 1 776 242 | 10/2011 |
| EP | 2 384 902 | 11/2011 |
| EP | 2 450 735 | 5/2012 |
| EP | 2 461 203 | 6/2012 |
| EP | 2 608 161 | 6/2013 |
| EP | 2 660 070 | 11/2013 |
| EP | 2 708 371 | 3/2014 |
| EP | 2 727 742 | 5/2014 |
| EP | 2 853 411 | 4/2015 |
| EP | 2 860 042 | 4/2015 |
| EP | 2 886 356 | 6/2015 |
| EP | 2 365 376 | 10/2015 |
| EP | 2 400 338 | 12/2015 |
| JP | 2013-509312 | 3/2013 |
| JP | 2013-509314 | 3/2013 |
| WO | WO 95/026916 | 10/1995 |
| WO | WO 98/015418 | 4/1998 |
| WO | WO 00/013916 | 3/2000 |
| WO | WO 01/070516 | 9/2001 |
| WO | WO 2005/106601 | 11/2005 |
| WO | WO 2006/013215 | 2/2006 |
| WO | WO 2006/125224 | 11/2006 |
| WO | WO 2007/020048 | 2/2007 |
| WO | WO 2007/056782 | 5/2007 |
| WO | WO 2007/131375 | 11/2007 |
| WO | WO 2009/126030 | 10/2009 |
| WO | WO 2011/051668 | 5/2011 |
| WO | WO 2011/051670 | 5/2011 |
| WO | WO 2011/066990 | 6/2011 |
| WO | WO 2012/048847 | 4/2012 |

(56) References Cited

FOREIGN PATENT DOCUMENTS

| WO | WO 2012/055505 | 5/2012 | | |
|----|----------------|--------|---|---|
| WO | WO 2012/055506 | 5/2012 | | |
| WO | WO 2012/055537 | 5/2012 | | |
| WO | WO 2012/055538 | 5/2012 | | |
| WO | WO 2012/084169 | 6/2012 | | |
| WO | WO 2012/084182 | 6/2012 | | |
| WO | WO 2013/007374 | 1/2013 | | |
| WO | WO 2013/055318 | 4/2013 | | |
| WO | WO 2013/091819 | 6/2013 | | |
| WO | WO-2013079542 A2 * | 6/2013 | ............... | G02B 5/28 |
| WO | WO 2014/024145 | 2/2014 | | |
| WO | WO 2014/044402 | 3/2014 | | |
| WO | WO 2014/060089 | 4/2014 | | |
| WO | WO 2014/060115 | 4/2014 | | |
| WO | WO 2014/065799 | 5/2014 | | |
| WO | WO 2014/095057 | 6/2014 | | |
| WO | WO 2015/011494 | 1/2015 | | |
| WO | WO 2015/078572 | 6/2015 | | |
| WO | WO 2015/078573 | 6/2015 | | |
| WO | WO 2016/065331 | 4/2016 | | |
| WO | WO 2017/011476 | 1/2017 | | |
| WO | WO 2017/184581 | 10/2017 | | |
| WO | WO 2019/077419 | 4/2019 | | |

OTHER PUBLICATIONS

Hecht, Eugene, "Optics", Third Edition, Addison-Wesley Publishing Company, Ch. 9.3.1, 1998.

International Preliminary Report on Patentability and Written Opinion received in PCT Application No. PCT/US2015/057235, dated May 4, 2017 in 10 pages.

International Preliminary Report on Patentability and Written Opinion received in PCT Application No. PCT/US2016/041935, dated Jan. 25, 2018 in 9 pages.

International Search Report and Written Opinion received in PCT Application No. PCT/US2015/057235, dated Feb. 23, 2016 in 12 pages.

International Search Report and Written Opinion received in PCT Application No. PCT/US2016/041935, dated Nov. 4, 2016 in 12 pages.

International Search Report and Written Opinion received in PCT Application No. PCT/US2017/028094, dated Aug. 14, 2017 in 14 pages.

"Positive and Negative Photoresist", https://web.archive.org/web/20151017081844/http://www.ece.gatech.edu:80/research/labs/vc/theory/PosNegRes.html, as archived Oct. 17, 2015 in 1 page.

International Preliminary Report on Patentability and Written Opinion received in PCT Application No. PCT/US2017/028094, dated Nov. 1, 2018 in 11 pages.

International Preliminary Report on Patentability and Written Opinion received in PCT Application No. PCT/US2018/056296, dated Apr. 21, 2020 in 24 pages.

International Search Report and Written Opinion received in PCT Application No. PCT/US2018/056296, dated Dec. 11, 2018 in 27 pages.

* cited by examiner

OPTICAL PRODUCTS, MASTERS FOR FABRICATING OPTICAL PRODUCTS, AND METHODS FOR MANUFACTURING MASTERS AND OPTICAL PRODUCTS

INCORPORATION BY REFERENCE TO ANY PRIORITY APPLICATIONS

This application claims the benefit of priority of U.S. Provisional Application No. 62/068,540 filed on Oct. 24, 2014, the entire disclosure of which is expressly incorporated herein by reference.

TECHNICAL FIELD

The present application generally relates to optical products, masters (e.g., master and/or daughter shims) for fabricating an optical product, and methods for manufacturing the masters and optical products. In particular, the optical product can be configured, when illuminated, to reproduce by reflected (or refracted) light, a 3D image (e.g., an image that appears three-dimensional) of at least a part of a 3D object.

DESCRIPTION OF THE RELATED TECHNOLOGY

Optical products can be used for a variety of purposes such as to reproduce a 3D image. Such products can be placed on decorative signs, labels, packaging, and consumer goods. Some optical products can be used as an anti-counterfeit feature, for example, on currency (e.g., a banknote). Holograms have traditionally been used as a counterfeit deterrent. However, this technology has become so widespread with hundreds if not thousands of holographic shops around the world that holograms are now viewed as having poor security. Optically variable inks and optically variable magnetic inks have also enjoyed for the past decade a high security place on banknotes. However, these products have now been simulated or have been even made from similar materials as the originals that these security elements are now being questioned as a high security feature. Motion type security elements have been adopted into banknotes, but even here, security has been compromised as this feature has also been used on commercial products. Thus, what is needed is a new security feature that the average person readily recognizes, has no resemblance to holograms or inks, is readily verified as to its authenticity, is difficult to counterfeit, is easily manufactured in quantity and can be readily incorporated into an item such as a banknote.

Manufacturing optical products, e.g., in relatively large quantities for commercial use, can utilize a master to fabricate the optical product. A master can be either a negative or positive master. For example, a negative master can form a surface of the optical product that is complementary to the surface of the master. As another example, a positive master can provide a surface for the optical product that is substantially similar to the surface of the master.

SUMMARY

Various embodiments described herein comprise a master for fabricating an optical product. The optical product can be configured, when illuminated, to reproduce by reflected light, a 3D image of at least a part of a 3D object. The master can comprise a first surface and a second surface opposite the first surface. The second surface can comprise a plurality of portions. Each portion can correspond a point on a surface of the 3D object. Each portion can comprise features corresponding to non-holographic elements on the optical product. A gradient (e.g., slope) in the features can correlate to an inclination of the surface of the 3D object at the corresponding point. In addition, an orientation of the features can correlate to an orientation of the surface of the 3D object at the corresponding point.

Certain embodiments described herein also include an optical product configured, when illuminated, to reproduce by reflected light, a 3D image of at least a part of a 3D object. The optical product can comprise a first surface and a second surface opposite the first surface. The second surface can comprise a plurality of portions. Each portion can correspond to a point on a surface of the 3D object. Each portion can comprise non-holographic features configured to produce at least part of the 3D image of the 3D object without relying on diffraction. A gradient in the non-holographic features can correlate to an inclination of the surface of the 3D object at the corresponding point. In addition, an orientation of the non-holographic features can correlate to an orientation of the surface of the 3D object at the corresponding point.

Furthermore, various embodiments described herein include a method for manufacturing a master for fabricating an optical product. The optical product can be configured, when illuminated, to reproduce by reflected light, a 3D image of at least a part of a 3D object. The method can comprise providing a 2D data file configured to describe the 3D image. The data file can comprise a plurality of portions. Each portion can correspond to one or more points on a surface of the 3D object. Each portion can comprise features of intensity corresponding to non-holographic elements on the optical product. A gradient in intensity can correlate to an inclination of the surface of the 3D object at the one or more corresponding points. In addition, an orientation of the features can correlate to an orientation of the surface of the 3D object at the one or more corresponding points. The method can also comprise manufacturing the master based at least in part on the 2D data file.

Certain embodiments described herein of a master, optical product, and/or data file can also include one or more of the following (1) a majority of the plurality of portions comprising a single non-holographic feature, (2) a majority of the plurality of portions comprising one or more non-holographic features discontinuous with one or more non-holographic features in surrounding adjacent portions, (3) a majority of the plurality of portions comprising one or more non-holographic features having different orientations as one or more non-holographic features in surrounding adjacent portions, and/or (4) one or more non-holographic features comprising non-linear features when viewed in a cross-section. In some embodiments, each portion comprising one or more non-holographic features can be configured to produce at least part of the image without relying on diffraction (1) at a viewing angle at least between 20 degrees to 160 degrees relative to a plane of the optical product as the optical product is tilted and (2) at a viewing angle at least between 20 degrees to 90 degrees relative to the plane of the optical product as the optical product is rotated at least throughout the range of 90 degrees (rotated at least throughout the range of 180 degrees, rotated at least throughout the range of 270 degrees, or rotated at least throughout the range of 360 degrees) in the plane of the optical product.

In some embodiments, the size of the portion may assist in reducing iridescence or a change in color with change in angle of view or change in angle of illumination such as results when tilting the product with respect to the viewer and/or source of illumination. Accordingly, in various embodiments, the optical product does not exhibit a rainbow-like array of displayed colors where colors simultaneously appear in the order of a rainbow. Also, in some embodiments, the color of light emanating from the product does not appear to change when tilting the product or the viewer with respect to the product or the illumination with respect to the product, for example, in order of progressively increasing wavelength or in order of progressively decreasing wavelength (e.g., in progressive order of the arrangement of colors in the rainbow).

The size of the portion may be sufficiently large to produce light that can pass through a circular pupil 5 mm in diameter located 24 inches from the product that includes a plurality of colors that mix together to form white light. Accordingly, for a person viewing the product with their eye positioned 24 inches from the product and having a pupil of 5 mm in diameter, light from the product will enter the eye and be mixed together to form white light. The person thus does not see iridescence or change in color with change in angle of view or angle of illumination or tilt of the product. Other factor besides the size of the portion may contribute to this effect, even if the size of the portion is not sufficiently large on its own to cause this lack of iridescence. For example, not having multiple grating like features in a single portion may reduce this effect. Similarly, having a large number or percentage of portions that do not have multiple grating like features but instead have a single surface may contribute to reducing iridescence or change in color with angle. Additionally, having features with a curved surface within the portion may help counter the iridescent effect. The curved features may, for example, enhance mixing of different colors so that white light is sensed by the viewer. Even if multiple features are included in a portion, these features may be curved and this curvature may potentially reduce the iridescence. Also, the amount of portions that have features that are oriented differently from each other may be increased and the amount of portions that have a shift in phase or otherwise introduce a discontinuity may be increased, possibly resulting in increased mixing of color components and reducing this effect of diffractive spectral dispersion Various embodiments disclosed herein can be used for security documents, in particular, as security threads in bank notes or as a patch or as a window. Other security items such as passports, ID cards, chip cards, credit cards, stock certificates and other investment securities, vouchers, admission tickets and commercial packages that protect items of value such as CD's, medicinal drugs, car and aircraft parts, etc. may also be protected against counterfeiting using the concepts and embodiments described herein.

DETAILED DESCRIPTION

Figure 1A:
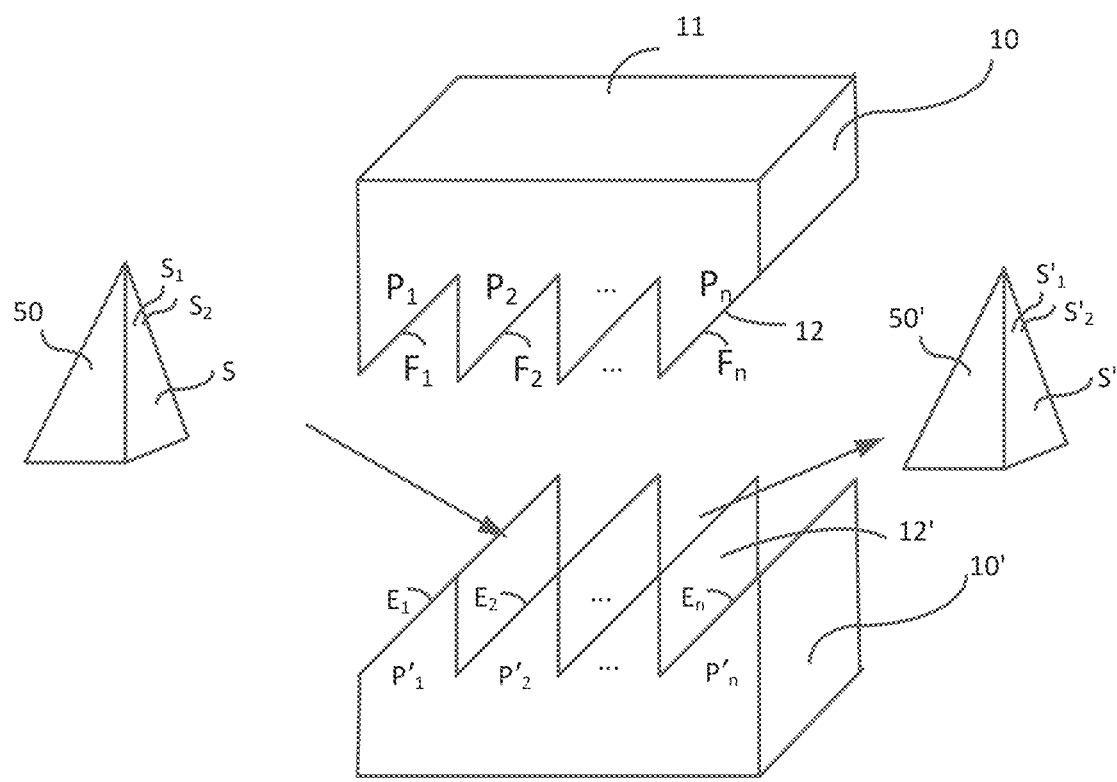
FIG. 1A schematically illustrates an example master and optical product in accordance with certain embodiments described herein.

In various embodiments, a master (e.g., a master and/or daughter shim) for fabricating an optical product is provided. The optical product, when illuminated, can reproduce an overt 3D image (e.g., an image that appears 3D to the naked eye) of a 3D object. Compared to ink printed images, the reflective surface of various embodiments of the optical product can produce a brighter mirror-like image produced by reflecting (or refracting) light incident on the surface. In certain such embodiments, the surface normals of the 3D object are mimicked as surface relief on the master and/or optical product. The surface relief on the master and/or optical product can be thinner than the 3D object, yet produce the same appearance of the 3D object. This property is similar to Fresnel lenses, where the surface relief allows a lens to be produced that is thinner than a comparable non-Fresnel lens. Unlike Fresnel lenses, however, certain embodiments disclosed herein are not limited in the type of 3D object that can be reproduced (e.g., linear and regularly shaped objects). As such, realistic and bright 3D images can be produced on relatively thin films (e.g., 30 µm and less in thickness, 25 µm and less in thickness, 15 µm and less in thickness, or any ranges in between these values). Thin films may be advantageous for different applications. In addition, special effects can be integrated into the image. In various embodiments described herein, the optical product can advantageously be used in applications for flexible packaging, brand identification, tamper evident containers, currency (e.g., a banknote), decoding messages, authenticity, and security, etc. Some security applications include incorporation of small detailed features, incorporation of non-symmetrical features, incorporation of machine readable features, etc.

In certain embodiments, the optical product can be incorporated into an item as an embedded feature, a hot stamp feature, a windowed thread feature, or a transparent window feature. For example, on an item such as a banknote, the optical product can be a patch, a window, or a thread. The optical product can have a thickness of less than 30 µm, less than 25 µm, or less than 15 µm. In various embodiments, the image can appear 3D by the naked eye.

In some embodiments, the image can be seen at a viewing angle between 20 degrees to 160 degrees, between 15 degrees to 165 degrees, between 10 degrees to 170 degrees, between 5 degrees to 175 degrees, or between 0 degrees to 180 degrees relative to the plane of the item (e.g., relative to the banknote plane) as the item is tilted. For example, the image can be viewable within one or more of these viewing angle ranges relative to the plane of the item.

In some embodiments, the image can be seen at a viewing angle between 20 degrees to 90 degrees, between 15 degrees to 90 degrees, between 10 degrees to 90 degrees, between 5 degrees to 90 degrees, or between 0 degrees to 90 degrees relative to the normal of the item as the item is rotated the normal of the item (e.g., in the plane of the item). For example, the image can be viewable and/or visible within one or more of these viewing angle ranges as the item is rotated (e.g., rotated at least throughout the range of 90 degrees, rotated at least throughout the range of 180 degrees, rotated at least throughout the range of 270 degrees, or rotated at least throughout the range of 360 degrees) about the normal of the item (e.g., in the plane of the item).

FIG. 1A schematically illustrates an example master 10 for fabricating an optical product 10' in accordance with certain embodiments described herein. In various embodiments, the master 10 can include a first surface 11 and a second surface 12 opposite the first surface 11. As shown in FIG. 1A, the second surface 12 can include a plurality of portions $P_1, P_2, \ldots P_n$. Each portion $P_n$ can correspond to a plurality of portions $P'_1, P'_2, \ldots P'_n$ on the optical product 10'. The plurality of portions $P'_1, P'_2, \ldots P'_n$ on the optical product 10' can also be referred to as a cell, pixel, or a tile. Each portion $P'_n$ can have a length between 30 µm and 100 µm, between 35 µm and 55 µm, or between 40 µm and 50 µm. Each portion $P'_n$ can have a width between 30 µm and 100 µm, between 35 µm and 55 µm, or between 40 µm and 50 µm. Accordingly, in various embodiments, the aspect ratio of each portion $P'_n$ can be 1:1 or 1:1.1.

Each portion $P_n$ of the master 10 (and each portion $P'_n$ of the optical product 10') can correspond to a point $S_1, S_2, \ldots S_n$ on a surface S of the 3D object 50. Each portion $P_n$ can include features $F_1, F_2, \ldots F_n$ corresponding to elements $E_1, E_2, \ldots E_n$, e.g., non-holographic elements, on the optical product 10'. A gradient (e.g., slope) in the features $F_1, F_2, \ldots F_n$ can correlate to an inclination (e.g., slope) of the surface S of the 3D object 50 at the corresponding point $S_1, S_2, \ldots S_n$. In addition, an orientation of the features $F_1, F_2, \ldots F_n$ can correlate to an orientation of the surface S of the 3D object 50 at the corresponding point $S_1, S_2, \ldots S_n$. Accordingly, with certain embodiments disclosed herein, an optical product 10' fabricated using the example master 10 can be configured, when illuminated, to reproduce by reflected (or refracted) light, a 3D image 50' (e.g., an image that appears 3D) of at least a part of a 3D object 50. The image can be observed by the naked eye and under various lighting conditions (e.g., specular, diffuse, and/or low light conditions).

The optical product 10' can be used on a variety of products to reproduce a 3D image 50' of at least a part of a 3D object 50. For example, the optical product 10' can be placed on decorative signs, advertisements, labels (e.g., self-adhesive labels), packaging (e.g., consumer paper board packaging and/or flexible packaging), consumer goods, collectible cards (e.g., baseball cards), etc. The optical product 10' can also be advantageously used for authenticity and security applications. For example, the optical product 10' can be placed on currency (e.g., a banknote), credit cards, debit cards, passports, driver's licenses, identification cards, documents, tamper evident containers and packaging, bottles of pharmaceuticals, etc.

In various implementations, the optical product 10' can be a reflective or transmissive device. For example, the optical product 10' can include reflective material (e.g., reflective metal such as aluminum, copper, or silver disposed on the plurality of elements $E_1, E_2, \ldots E_n$, or a transparent, relatively high refractive index material such as ZnS or $TiO_2$ disposed on the plurality of elements $E_1, E_2, \ldots E_n$ creating a semi-transmitting/partially reflective boundary). Depending on the thickness of the reflective material, the optical product 10' can be reflective or transmissive. Depending on the thickness of the reflective material, the optical product 10' can be partially reflective or partially transmissive. The thickness of the reflective material at which the optical product 10' is reflective or transmissive can depend on the chemical composition of the reflective material.

Accordingly, in some embodiments, the optical product 10' can include a reflective surface 12' from which light can reflect from the elements $E_1, E_2, \ldots E_n$ to reproduce the image 50' of the 3D object 50 or at least part of the 3D object 50. For example, the optical product 10' can be made of a reflective metal (e.g., aluminum, copper, or silver), a semi-transparent metal, or a material (e.g., polymer, ceramic, or glass) coated with a reflective metal. Reflective coatings that employ non-metallic material can also be employed.

In some embodiments where the elements $E_1, E_2, \ldots E_n$ are coated with a reflective metal, the thickness of the coating layer can be greater than or equal to 40 nm such that the layer is opaque. Alternatively, the thickness of the reflective metal can be less than 40 nm such that the layer is semi-transparent (e.g., 30% transparent 40% transparent, 50% transparent, 60% transparent, 70% transparent, or any ranges inbetween these values, etc.). In reflective embodiments, the elements $E_1, E_2, \ldots E_n$ can reflect light towards or away from the observer's eye to reproduce the image 50' the 3D object 50. For example, the elements $E_1, E_2, \ldots E_n$ can reflect light towards the observer's eye in bright areas, and reflect light away from the observer's eye in dark areas. In some embodiments, the slopes of the elements $E_n$ can be configured to create the 3D depth perception of the image. For example, elements $E_n$ with less steep slopes can cause light to reflect toward the observer's eye creating more brightness, while elements $E_n$ with steeper slopes can cause light to reflect away from the observer's eye creating more darkness.

In some other embodiments (e.g., for a transmissive device), the optical product 10' can include a layer (e.g., a coating) of a transparent, relatively high refractive index material such as, for example, ZnS or $TiO_2$. In some such embodiments, light can transmit through the material and can also reflect at each of the elements $E_1, E_2, \ldots E_n$ due to the presence of the relatively high index layer which can create index mismatch and results in Fresnel reflection. The relatively high index material can be up to a full visible wavelength in thickness in some embodiments. If a color tint is used, the relatively high index material can be up to a ¼ of a visible wavelength in thickness in some embodiments.

Furthermore, the optical product 10' can include a protective covering, e.g., an organic resin, to protect the elements $E_1, E_2, \ldots E_n$ and/or any coating layer from corrosion from acidic or basic solutions or organic solvents such as gasoline and ethyl acetate or butyl acetate. In various implementations, the protective covering can also provide protection during subsequent processing steps and use of the optical product 10' (e.g., during the manufacturing of currency and/or by general handling by the public).

In various embodiments, the optical product 10' can be placed on or in another surface (e.g., as an embedded feature, a hot stamped feature such as a patch, a windowed thread feature, or a transparent window feature). In other embodiments, the optical product 10' can be placed under another surface (e.g., laminated under a film and/or cast cured). In some embodiments, the optical product 10' can be placed between two other surfaces (e.g., hot stamped on another surface and laminated under a film). Additional features associated with the optical product 10' will become apparent with the disclosure herein of the master 10 for fabricating the optical product 10'.

The image 50' of at least part of the 3D object 50 can be reproduced when the optical product 10' is illuminated. In various embodiments, the image 50' can be reproduced by a multitude of relatively small mirrors (e.g., each of the elements $E_1$, $E_2$, ... $E_n$ having both a length and width between 30 μm and 100 μm, between 35 μm and 55 μm, or between 40 μm and 50 μm) which can be curved (e.g., have a freeform curvature) or planar. For example, in some embodiments, a reflective surface of the optical product 10' can provide a surface for specular reflection, such that the image 50' can be produced by the reflected light (e.g., like a mirror). Accordingly, various embodiments can produce a bright, high quality image. Some embodiments can also utilize techniques for producing diffuse reflection, e.g., for special or desired effects. Furthermore, the image 50' can be a substantially similar reproduction (e.g., with similar details), an approximate reproduction (e.g., with less details), and/or a scaled copy (e.g., scaled up or down in size) of the 3D object 50 or part of the 3D object 50.

In general, the 3D object 50 to be reproduced is not particularly limited and can advantageously include rotationally non-symmetrical and/or irregularly shaped objects, as well as symmetrical and/or regularly shaped objects. For example, the 3D object 50 can include one or more alphanumeric characters and/or symbols. For example, the 3D object 50 can include one or more text, one or more alphabetic characters, one or more numeric characters, one or more letters, one or more numbers, one or more symbols, one or more punctuation marks, one or more mathematical operators, etc. The 3D object 50 can also include one or more graphical images or logos, e.g., a company logo, a team logo, product branding designs, etc. Accordingly, the 3D object 50 can include irregularly shaped features in addition to planar and curved features. In some embodiments, the 3D object 50 can comprise animals, humans, plants or trees, landscapes, buildings, cars, boats, airplanes, bicycles, furniture, office equipment, sports equipment, foods, drinks, personal care items, flags, emblems, symbols like country, company or product symbols including trademarks, or parts thereof or groups or combination of these items with or without other items. The objects may be cartoon or artistic renditions. A wide range of other objects are possible.

As set forth herein, in various embodiments, the image 50' can be seen at various viewing angles (e.g., between 20 degrees to 160 degrees, between 15 degrees to 165 degrees, between 10 degrees to 170 degrees, between 5 degrees to 175 degrees, or between 0 degrees to 180 degrees relative to the plane of the item (e.g., relative to the banknote plane). For example, when the example optical product 10' is tilted, upon viewing the example optical product 10' at different viewing angles (or upon different angles of illumination), different sets of elements $E_1$, $E_2$, ... $E_n$ can be seen by the observer to provide the different images of the 3D object.

In some embodiments, the image can be seen at a viewing angle between 20 degrees to 90 degrees, between 15 degrees to 90 degrees, between 10 degrees to 90 degrees, between 5 degrees to 90 degrees, or between 0 degrees to 90 degrees relative to the normal of the item as the item is rotated about the normal of the item. For example, the image can be viewable within one or more of these viewing angle ranges as the item is rotated (e.g., rotated at least throughout the range of 90 degrees, rotated at least throughout the range of 180 degrees, rotated at least throughout the range of 270 degrees, or rotated at least throughout the range of 360 degrees) about the normal of the item.

Furthermore, in certain embodiments, the image 50' can be substantially without iridescence or change in color with angle. For example, in various embodiments, there are substantially no colors (e.g., rainbow effect), other diffractive colors, or ghosting effects in the image 50'. For example, in certain embodiments, the size of the portions $P'_1$, $P'_2$, ... $P'_n$ can have a length and width between 30 μm and 100 μm, between 35 μm and 55 μm, or between 40 μm and 50 μm. In some such embodiments (e.g., between 40 μm and 50 μm), the portions $P'_n$ may be small enough such that the portions $P'_n$ are not resolvable by a human observer under normal viewing conditions (e.g., a reading distance of 18 to 24 inches between the eye and the item to be viewed). In addition, without being bound by theory, the portions $P'_n$ may be big enough such that the cone of light passing through the pupil (e.g., 5 mm in diameter) is small enough such that the eye may see a majority of the colors mixed as white light at a distance of 18-24 inches.

As another example, in some embodiments, a majority (e.g., greater than 50%, greater than 55%, greater than 60%, greater than 65%, greater than 70%, greater than 80%, greater than 90%, and any ranges in between these values) of the plurality of portions $P'_1$, $P'_2$, ... $P'_n$ on the optical product 10' can include a single non-holographic element $E_1$ (as opposed to a plurality of spaced apart non-holographic elements $E_n$ that may resemble a grating-like feature). Without being bound by theory, grating-like features can cause light to be dispersed with some of the light collected by the pupil of the eye. If the period of the grating-like feature is small enough, the light captured by the pupil may appear as a color. Accordingly, in various embodiments of the optical product 10' that have a majority of the plurality of portions $P'_1$, $P'_2$, ... $P'_n$ having not more than a single non-holographic reflective or refractive element $E_1$, unwanted color caused by grating-like features may possibly be substantially reduced and/or eliminated. Similarly, color change with angle of tilt can be reduced. In some embodiments, at least 20%, at least 30%, at least 40%, at least 50%, at least 60%, at least 70%, at least 80%, at least 90%, or any ranges in between these values) of the plurality of portions $P'_1$, $P'_2$, ... $P'_n$ on the optical product 10' can include a single non-holographic element $E_1$. In various embodiments, the single element may be slowly varying and/or substantially flat. In certain embodiments, the maximum average slope per portion with a single feature is less than ½, less than ⅓, less than ¼, less than ⅕, less than ⅙, potentially flat, and any ranges in between these values depending on feature height and width.

In addition, in portions $P'_n$ having a plurality of non-holographic elements $E_1$, $E_2$, ... $E_n$ (e.g., grating-like features), the elements $E_n$ can be discontinuous and/or having different orientation with non-holographic elements $E_1$, $E_2$, ... $E_n$ in surrounding adjacent portions $P'_n$. Without being bound by theory, the discontinuity and/or different orientations between grating-like features can cause a lateral shift of the grating-like feature. The lateral shift may cause the color spectrum to shift as well (e.g., from red to blue to green). The colors may combine on the retina providing an average white irradiance distribution. Accordingly, in embodiments of the optical product 10' that have a plurality of portions $P'_1, P'_2, \ldots P'_n$ including a plurality of non-holographic element $E_n$, unwanted color cause by grating-like features may be substantially reduced and/or eliminated. Similarly, color change with angle of tilt can be reduced.

Accordingly, certain embodiments of the optical product 10' can utilize a certain portion $P'_n$ size, a single non-holographic element $E_1$ in a portion $P'_n$, discontinuous and/or differently orientated elements $E_n$ to produce images that may be substantially without iridescence or change in color with angle. The application of these features can be dependent on the image to be formed.

Various embodiments described herein can create a 3D image primarily by the reflection of light without relying on diffraction (e.g., without relying on holographic or grating diffraction). In other embodiments, the optical product 10' can include surfaces which additionally include features from which light can diffract, e.g., at surface defects, at discontinuities at borders, and/or via incorporation of diffractive or holographic elements. Such diffractive or holographic features can be combined with the surface features disclosed herein that produce an image of a 3D object using reflection (or possibly refraction, e.g., in transmission) without relying on diffraction.

In various embodiments, the master 10 can be either a negative or positive master. Whether as a negative or positive master, the method to produce the master 10 is not particularly limited. For example, the features $F_1, F_2, \ldots F_n$ on surface 12 of the master 10 can be produced using any technique known in the art or yet to be developed, including but not limited to photolithography (e.g., UV or visible light), electron beam lithography, and ion beam lithography to name a few. Additionally, the materials that can be used to manufacture the master 10 are not particularly limited and can include glasses, ceramics, polymers, metals, etc.

As a negative master, the master 10 can form a surface 12' of the optical product 10' that is complementary to the surface 12 of the master 10. For example, as shown in FIG. 1A, the features $F_1, F_2, \ldots F_n$ on the surface 12 of the master 10 can be the inverse of the elements $E_1, E_2, \ldots E_n$ on the surface 12' of the optical product 10'. In such embodiments, the master 10 can be used to form the optical product 10'. For example, the master 10 can be used to emboss the elements $E_1, E_2, \ldots E_n$ onto a metal sheet, a polymeric substrate such as a thermoformable polymer, or a UV curable photoresist layer such as a UV curable resin, or to injection mold the elements $E_1, E_2, \ldots E_n$ onto a polymer.

As another example, as a positive master, the master 10 can provide a surface 12' for the optical product 10' that is substantially similar to the surface 12 of the master 10. The features $F_1, F_2, \ldots F_n$ on the surface 12 of the master 10 can be substantially similar to the elements $E_1, E_2, \ldots E_n$ on the surface 12' of the optical product 10'. In some such embodiments, the positive master 10 can provide a model for the optical product 10'. In other such embodiments, the positive master 10 can be used to create an inverse image of the 3D object 50. In addition, the positive master 10 can be used to fabricate one or more negative masters.

Although the master 10 is shown producing a product directly, in certain embodiments the master 10 is employed to produce one or more other masters (e.g., daughter shims) or intermediate surfaces that can in turn be used to produce a product. For example a first negative master can be used to produce a second master that is a positive master. The second positive master can be used to make a third negative master. The third negative master can be used to produce a fourth positive master. The fourth positive master can be used to produce a product. Accordingly, a tooling tree of masters (e.g., four, five, six, etc. generations deep) can be produced.

Certain embodiments of the optical product 10' disclosed herein can be advantageously manufactured on a large industrial scale. Some embodiments can be manufactured by embossing the elements $E_1, E_2, \ldots E_n$ into an UltraViolet (UV) curable resin coated onto various polymeric substrates, such as, for example, polyethylene terephthalate (PET), oriented polypropylene (OPP), low density polyethylene (LDPE), linear low density polyethylene (LLDPE), polypropylene (PP), polyvinyl chloride (PVC) polycarbonate (PC) or any other type of plastic film or carrier. For thermoformable plastics such as PVC and PC, the elements $E_1, E_2, \ldots E_n$ can be embossed directly into the substrate without the UV curable layer. In various embodiments, the polymeric substrate can be clear. The polymeric substrates can have a thickness less than or equal to 30 microns, less than or equal to 25 microns, or less than or equal to 15 microns. Some such polymeric substrates having elements $E_1, E_2, \ldots E_n$ can be formed into security threads that can be incorporated into a banknote having a paper thickness of 100 microns.

Figure 1B:
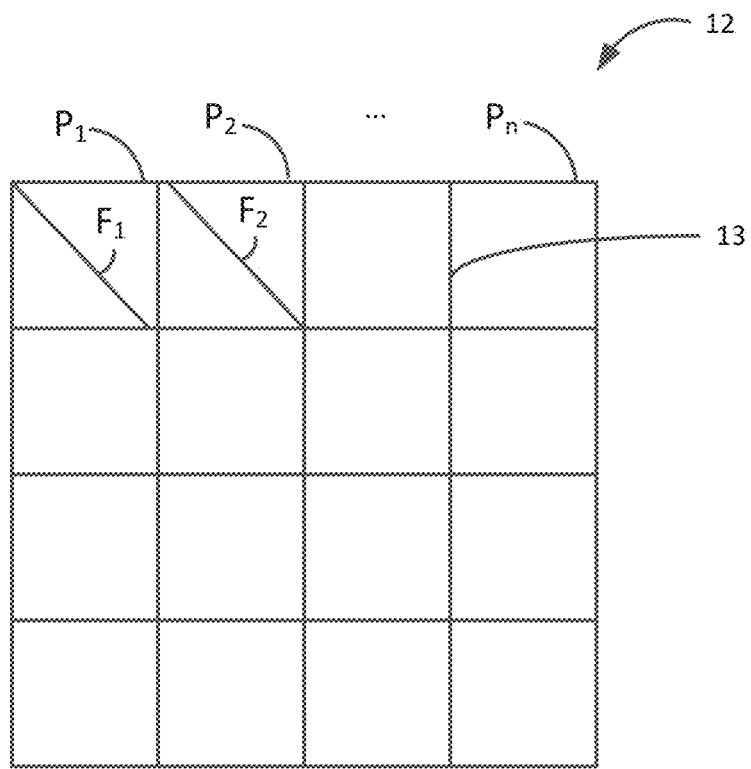
FIG. 1B schematically illustrates a top view of the surface of a master for fabricating an optical product in accordance with certain embodiments described herein.

With continued reference to FIG. 1A, the master 10 can include a first surface 11 and a second surface 12. The first surface 11 is shown for simplicity as a planar surface. However, the shape of the first surface 11 is not particularly limited. The second surface 12 can be opposite the first surface 11. The second surface 12 can include a plurality of portions $P_1, P_2, \ldots P_n$. In some embodiments, the plurality of portions $P_1, P_2, \ldots P_n$ can form a single cell (e.g., a mono-cell). In other embodiments, the plurality of portions $P_1, P_2, \ldots P_n$ can form a plurality of cells. For example, each of the plurality of portions $P_1, P_2, \ldots P_n$ can form a cell of the plurality of cells. The number of cells is not particularly limited and can depend on factors such as size and resolution of the image to be reproduced. In various embodiments, the portions $P_1, P_2, \ldots P_n$ can form a pixelated surface. For simplicity, only one row of portions $P_1, P_2, \ldots P_n$ is shown in FIG. 1A. However, certain embodiments can include additional rows and columns of portions $P_1, P_2, \ldots P_n$. For example, as shown in FIG. 1B, the portions $P_1, P_2, \ldots P_n$ can include a plurality of rows and columns spanning across the surface 12 of the master 10. For simplicity, only the first row is labeled as $P_1, P_2, \ldots P_n$. Furthermore, although FIG. 1B shows a 4×4 array of portions $P_1, P_2, \ldots P_n$, the numbers of rows, columns, and portions $P_1, P_2, \ldots P_n$ are not particularly limited.

As also shown in FIG. 1B, in some embodiments, borders 13 can surround at least part of the portions $P_1, P_2, \ldots P_n$. The borders 13 can substantially surround a portion $P_n$, or can surround just part of a portion $P_n$. In some embodiments, discontinuities can extend around all or substantially all of the portion $P_n$. In other embodiments, discontinuities may extend on just a part of the portion $P_n$. The borders 13 can help define the size and shape of the portions $P_1, P_2, \ldots P_n$ in some embodiments. However, the size and shape of the portions $P_1, P_2, \ldots P_n$ are not particularly limited. For example, some of the portions $P_1, P_2, \ldots P_n$ can comprise a symmetrical shape. For example, the symmetrical shape can include a rectangle, a square, a rhombus, an equilateral triangle, an isosceles triangle, a regular polygon (e.g., a regular pentagon, a regular hexagon, a regular octagon, etc.), to name a few. The symmetrical shape can also include curvature, e.g., a circle, an ellipse, etc. In other embodiments, some of the portions $P_1, P_2, \ldots P_n$ can comprise a non-symmetrical shape, e.g., a non-rotationally symmetrical shape, and/or an irregular shape. In some embodiments, some of the portions $P_1, P_2, \ldots P_n$ can have a shape that is substantially the same as other portions $P_1, P_2, \ldots P_n$. In some embodiments, at least 20%, at least 30%, at least 40%, at least 50%, at least 60%, at least 70%, at least 80%, at least 90% (or any range in between these percentages) of the portions $P_1, P_2, \ldots P_n$ can have the same shape, size, or both. In other embodiments, some of the portions $P_1, P_2, \ldots P_n$ can have a shape that is different from other portions $P_1, P_2, \ldots P_n$.

Arrangement of the portions $P_1, P_2, \ldots P_n$ is not particularly limited. For example, whether with or without borders, whether symmetrically shaped or non-symmetrically shaped, or whether regularly or irregularly shaped, the portions $P_1, P_2, \ldots P_n$ can form a periodic array. In other embodiments, whether with or without borders, whether symmetrically shaped or non-symmetrically shaped, or whether regularly or irregularly shaped, the portions $P_1, P_2, \ldots P_n$ can form an aperiodic array. In yet other embodiments, the portions $P_1, P_2, \ldots P_n$ can form a combination of periodic and aperiodic arrays.

With continued reference to FIG. 1A, each portion $P_n$ can correspond to a point $S_1, S_2, \ldots S_n$ on the surface S of the 3D object 50, and each portion $P_n$ can include one or more features $F_1, F_2, \ldots F_n$. For simplicity, the features $F_1, F_2, \ldots F_n$ shown in FIG. 1A appear linear and substantially similar to each other. However, the features $F_1, F_2, \ldots F_n$ can vary in number, size, shape, and orientation.

In certain embodiments, the features $F_1, F_2, \ldots F_n$ can include linear and/or curved features, for example as seen from a top or front view. In some embodiments, the features $F_1, F_2, \ldots F_n$ can include facets, such as linear or curved saw tooth shaped features. The size of the features $F_1, F_2, \ldots F_n$ are not particularly limited. However, from a manufacturing and economic perspective, in some embodiments, a smaller height (e.g., 0 μm to 10 μm) can be advantageous to reduce the amount of material used. Accordingly, in some embodiments, the heights of the features $F_1, F_2, \ldots F_n$ can be from close to 0 μm to 0.1 μm (e.g., 0 nm to 100 nm, 1 nm to 75 nm, or 1 nm to 50 nm), from close to 0 μm to 1 μm (e.g., 0 nm to 1000 nm, or 1 nm to 500 nm), from close to 0 μm to 5 μm (e.g., 1 nm to 5 μm, 10 nm to 5 μm, 50 nm to 5 μm, 75 nm to 5 μm, 0.1 μm to 5 μm, 0.5 μm to 5 μm, or 1 μm to 5 μm), or from close to 0 μm to 8 μm (e.g., 1 nm to 8 μm, 10 nm to 8 μm, 50 nm to 8 μm, 75 nm to 8 μm, 0.1 μm to 8 μm, 0.5 μm to 8 μm, or 1 μm to 8 μm), or from close to 0 μm to 10 μm (e.g., 1 nm to 10 μm, 10 nm to 10 μm, 50 nm to 10 μm, 75 nm to 10 μm, 0.1 μm to 10 μm, 0.5 μm to 10 μm, or 1 μm to 10 μm). In other embodiments, the heights of the features $F_1, F_2, \ldots F_n$ can go up to 15 μm, up to 20 μm, up to 25 μm, or any ranges from 1 μm, 2 μm, or 3 μm up to 25 μm. In yet other embodiments, the heights of the features $F_1, F_2, \ldots F_n$ can go up to 50 m if needed, e.g., depending on the desired size of the 3D image to be reproduced.

Furthermore, in some embodiments, the lateral dimensions of the features $F_1, F_2, \ldots F_n$ are not particularly limited, but can depend on the details of the 3D object. For example, for text, the lateral dimensions of the features $F_1, F_2, \ldots F_n$ can be less than 1 μm. Accordingly, the lateral dimensions of the features $F_1, F_2, \ldots F_n$ can be from close to 0 μm to 0.1 μm (e.g., 0 nm to 100 nm, 1 nm to 75 nm, or 1 nm to 50 nm), from close to 0 μm to 1 μm (e.g., 0 nm to 1000 nm, or 1 nm to 500 nm), from close to 0 μm to 5 μm (e.g., 1 nm to 5 μm, 10 nm to 5 μm, 50 nm to 5 μm, 75 nm to 5 μm, 0.1 μm to 5 μm, 0.5 μm to 5 μm, or 1 μm to 5 μm), or from close to 0 μm to 8 μm (e.g., 1 nm to 8 μm, 10 nm to 8 μm, 50 nm to 8 μm, 75 nm to 8 μm, 0.1 μm to 8 μm, 0.5 μm to 8 μm, or 1 μm to 8 μm), or from close to 0 μm to 10 μm (e.g., 1 nm to 10 μm, 10 nm to 10 μm, 50 nm to 10 μm, 75 nm to 10 μm, 0.1 μm to 10 μm, 0.5 μm to 10 μm, or 1 μm to 10 μm).

In various embodiments, a lateral distance between two features can be defined in some embodiments as a pitch. In some embodiments, the pitch between features within a portion $P_n$ can be substantially the same within the portion $P_n$. For example, in various embodiments, in portion $P_1$ of the portions $P_1, P_2, \ldots P_n$, the feature $F_1$ can comprise a plurality of features that form a periodic array such that the pitch is substantially the same within portion $P_1$. In addition, in some embodiments, the features $F_1, F_2, \ldots F_n$ among the multiple portions $P_1, P_2, \ldots P_n$, can form a periodic array such that the pitch is substantially the same among the portions $P_1, P_2, \ldots P_n$. In other embodiments, the features could be chirped and form an aperiodic array such that the pitch may be different among multiple portions $P_1, P_2, \ldots P_n$. However, although the pitch may be different for different portions $P_1, P_2, \ldots P_n$, the pitch can be slowly varying (e.g., less than 15% change per lateral distance, less than 12% change per lateral distance, less than 10% change per lateral distance, less than 8% change per lateral distance, less than 5% change per lateral distance, less than 3% change per lateral distance, or less than 1% change per lateral distance) among the portions $P_1, P_2, \ldots P_n$. In some embodiments, the pitch may uniformly change across multiple portions $P_1, P_2, \ldots P_n$. In other embodiments, the features could be chirped within a portion $P_n$ such that the pitch may be different within the portion $P_n$. In some such embodiments, the pitch within the portion $P_n$ may slowly vary (e.g., less than 15% change per lateral distance, less than 12% change per lateral distance, less than 10% change per lateral distance, less than 8% change per lateral distance, less than 5% change per lateral distance, less than 3% change per lateral distance, or less than 1% change per lateral distance). In some embodiments, the pitch may uniformly change with the portion $P_n$. The pitch in certain embodiments can be between 1 μm and 100 μm, between 1 μm and 75 μm, between 1 μm and 50 μm, or between 1 μm and 25 μm.

Figure 1C:
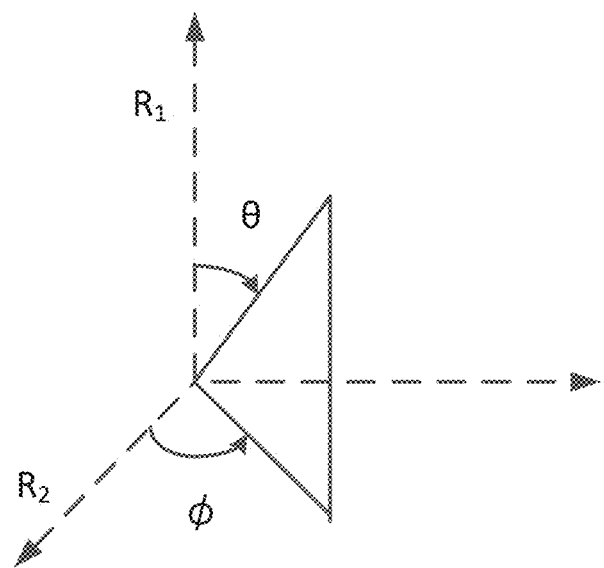
FIG. 1C schematically illustrates the inclination and orientation of a surface of a 3D object at a point on the surface.

With continued reference to FIG. 1A, the features $F_1, F_2, \ldots F_n$ can correspond to elements $E_1, E_2, \ldots E_n$ on the optical product 10', and since the optical product 10' is configured to reproduce the 3D object 50, aspects of the features $F_1, F_2, \ldots F_n$ can correlate to aspects of the surface S of the 3D object 50 at the corresponding point $S_1, S_2, \ldots S_n$. For example, a gradient (e.g., slope) in the features $F_1, F_2, \ldots F_n$ can correlate to an inclination of the surface S of the 3D object 50 at the corresponding point $S_1, S_2, \ldots S_n$. For example, in various embodiments, each feature can include a slope. A slope of the feature $F_1$ can correlate to the inclination of the surface S of the 3D object 50 at the corresponding point $S_1$. As shown in FIG. 1C, the slope of the feature $F_1$ can correlate to the polar angle $\theta_1$ from reference line $R_1$ of the 3D object 50. Accordingly, the slopes of the features $F_1, F_2, \ldots F_n$ can mimic the surface normals of the 3D object 50.

Various embodiments can advantageously have a uniform gradient (e.g., uniform slope) within each portion $P_n$ such that the gradient is a single value (e.g., a single polar angle $\theta_n$) at the corresponding point $S_n$ on the surface S of the 3D object 50. In other embodiments, the feature $F_n$ within a portion $P_n$ includes a plurality of features, and the features within the portion $P_n$ may have more than one gradient (e.g., different slopes). In such embodiments, the average gradient (e.g., average slope) of the features within the portion $P_n$ can correlate to the inclination of the surface S of the 3D object 50 at the corresponding point $S_n$.

In some embodiments, varying the slopes within and/or among portions $P_1, P_2, \ldots P_n$ can create contrast on the surface and therefore, on the image 50'. Furthermore, varying at least one of the height of features, pitch between features (e.g., lateral distance between two features), and slope of the features in one or more portions $P_1, P_2, \ldots P_n$ can be used in authenticity and security applications. For example, one can intentionally vary the pitch within one or more portions $P_n$, but maintain the given slopes. The image 50' of the 3D object 50 would be reproduced, yet upon closer inspection of the presence of the intentional variation within one or more portions $P_1, P_2, \ldots P_n$, authenticity can be verified. Other variations are possible.

In various embodiments, the orientation of features $F_1, F_2, \ldots F_n$ can correlate to an orientation of the surface S of the 3D object 50 at the corresponding point $S_1, S_2, \ldots S_n$. For example, an orientation of the feature $F_1$ can correlate to the orientation of the surface S of the 3D object 50 at the corresponding point $S_1$. As shown in FIG. 1C, the orientation of the feature $F_1$ can correlate to the azimuth angle $\varphi_1$ from reference line $R_2$ of the 3D object 50. Various embodiments can advantageously have a uniform orientation within each portion $P_n$, such that the orientation is a single value (e.g., a single azimuth angle $(P_n)$ at the corresponding point $S_n$ on the surface S of the 3D object 50. In other embodiments, the feature $F_n$ within a portion $P_n$ includes a plurality of features, and the features within the portion $P_n$ may have more than one orientation (e.g., different orientations). In such embodiments, the average orientation of the features within the portion $P_n$ can correlate to the orientation of the surface S of the 3D object 50 at the corresponding point $S_n$. Furthermore, the orientation of the features within and among the portions $P_1, P_2, \ldots P_n$, can slowly vary (e.g., less than 15% change per lateral distance, less than 12% change per lateral distance, less than 10% change per lateral distance, less than 8% change per lateral distance, less than 5% change per lateral distance, less than 3% change per lateral distance, or less than 1% change per lateral distance) within and among the portions $P_1, P_2, \ldots P_n$.

In some embodiments, where a feature $F_1$ includes multiple features within a portion, the features can appear discontinuous with other features within the portion. In some embodiments where the surface 12 of the master 10 is pixelated (e.g., having a plurality of cells), the features $F_1, F_2, \ldots F_n$ can appear discontinuous with features in surrounding adjacent portions. In other embodiments, the portions $P_1, P_2, \ldots P_n$ can form a single cell or a mono-cell. In some such embodiments, the features $F_1, F_2, \ldots F_n$ can appear continuous and smoothly varying depending on the shape. In other such embodiments, the features $F_1, F_2, \ldots F_n$ can appear discontinuous due to discontinuities in the 3D object 50.

In some embodiments, the features $F_1, F_2, \ldots F_n$ can comprise linear features corresponding to a substantially smooth region of the surface S of the 3D object 50. The features $F_1, F_2, \ldots F_n$ can also comprise non-linear features, e.g., curved features as seen from a top or front view, corresponding to a curved region of the surface S of the 3D object 50, e.g., instead of flat facets. In some embodiments, features $F_1, F_2, \ldots F_n$ that are linear can be used to correspond to a curved region of the surface S of the 3D object 50. In some embodiments, linear features on a master 10 can be used to represent a curved region by using a piecewise approximation function (e.g., a piecewise linear function such as a function comprising straight line sections). In some other embodiments, features $F_1, F_2, \ldots F_n$ that are non-linear can be used to correspond to a substantially smooth region of the surface S of the 3D object 50. In some such embodiments, non-linear features on a master 10 can be used to represent smooth regions on the surface S of the 3D object 50 because the features $F_1, F_2, \ldots F_n$ can correspond to relatively small sized features on the optical product 10'. For example, the pitch and/or texture on the optical product 10' can be between 1 μm and 100 μm, between about 1 μm and about 75 μm, between about 1 μm and about 50 μm, or between about 1 μm and about 25 μm.

With continued reference to FIG. 1A, as described herein, the features $F_1, F_2, \ldots F_n$ can correspond to aspects of the surface S of the 3D object 50 and can also correspond to elements $E_1, E_2, \ldots E_n$ on the optical product 10' such that the optical product 10' can reproduce an image 50' of the 3D object 50. In various embodiments, the elements $E_1, E_2, \ldots E_n$ on the optical product 10' can be non-holographic. For example, the elements $E_1, E_2, \ldots E_n$ do not need to rely on holography (e.g., effects based on diffraction and/or based on optical interference) to render a 3D image 50' of the 3D object 50. In some such embodiments, the features $F_1, F_2, \ldots F_n$ on the surface 12 of the master 10 can include non-sinusoidal features or non-quasi-sinusoidal features. In general, sinusoidal or quasi-sinusoidal features can be diffractive with +/− orders of equal intensity that generate a twin image. One positive order and one negative order can share the incident light and result in a simultaneous twin image with counter-intuitive movement of one image with respect to the other. Such effects may be non-ideal. In some embodiments that include non-sinusoidal or non-quasi-sinusoidal features, the features $F_1, F_2, \ldots F_n$ on the surface 12 of the master 10 can include other shapes, such as saw toothed shapes as described herein.

Although various embodiments described herein do not necessarily rely on holography to reproduce an image, some embodiments can include diffractive or holographic features (e.g., less than about 50% of the surface area, less than about 40% of the surface area, less than about 30% of the surface area, less than about 20% of the surface area, less than about 10% of the surface area, less than about 5% of the surface area, less than about 3% of the surface area, less than about 2% of the surface area, or less than about 1% of the surface area) to be used in conjunction with the non-holographic elements $E_1, E_2, \ldots E_n$ described herein. For example, in some embodiments, the second surface 12 of the master 10 can further comprise features corresponding to holographic elements on the optical product 10' in one or more portions $P_1, P_2, \ldots P_n$. In other embodiments, a holographic layer can be added over or under the surface 12' of the optical product 10'.

Figure 1D:
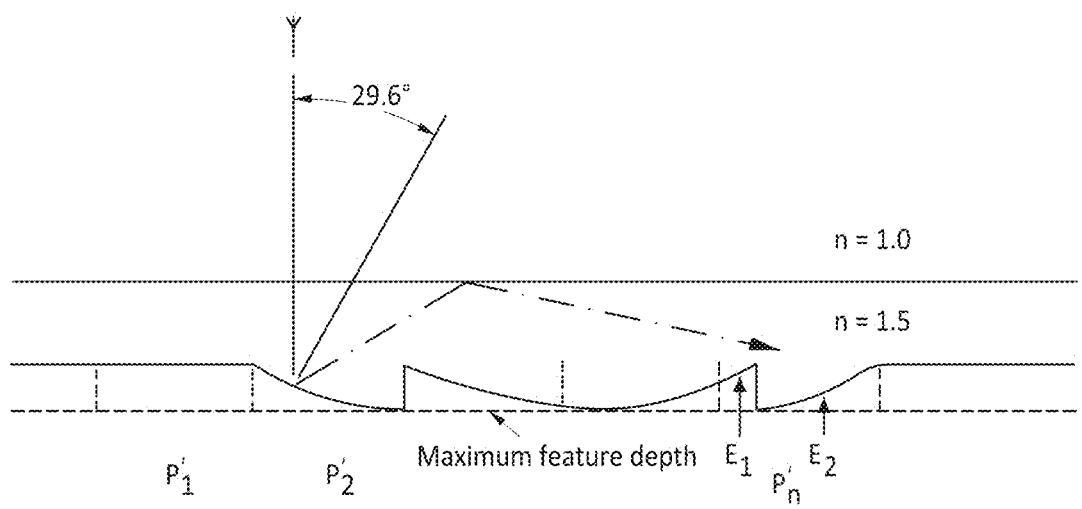
FIG. 1D is another example optical product 10' in accordance with certain embodiments described herein.

FIG. 1D is another example optical product 10' in accordance with certain embodiments described herein. As shown in FIG. 1D, the optical product 10' can include a plurality of portions $P'_1, P'_2, \ldots P'_n$. Each portion $P'_n$ can include elements $E_1, E_2, \ldots E_n$, e.g., non-holographic elements, on the optical product 10'. In some such embodiments, the elements $E_1, E_2, \ldots E_n$ can be embossed on the bottom surface of the substrate, e.g. UV curable resin having a refractive index of 1.5. The elements $E_1, E_2, \ldots E_n$ can be coated with a reflective coating. The elements $E_1, E_2, \ldots E_n$ may then be embedded between the substrate and the item to which the optical product 10' is attached. As described herein, the slopes of the elements $E_1, E_2, \ldots E_n$ can be configured to create the 3D depth perception of the image. For example, elements $E_1, E_2, \ldots E_n$ with less steep slopes can cause light to reflect toward the observer's eye creating more brightness, while elements $E_1, E_2, \ldots E_n$ with steeper slopes can cause light to reflect away from the observer's eye creating more darkness. In this example of an embedded optical product 10', elements $E_1, E_2, \ldots E_n$ with steep enough slopes can cause light to be totally internally reflected within the substrate (which has a higher index than the surrounding medium), and creating even more darkness.

Figure 1E:
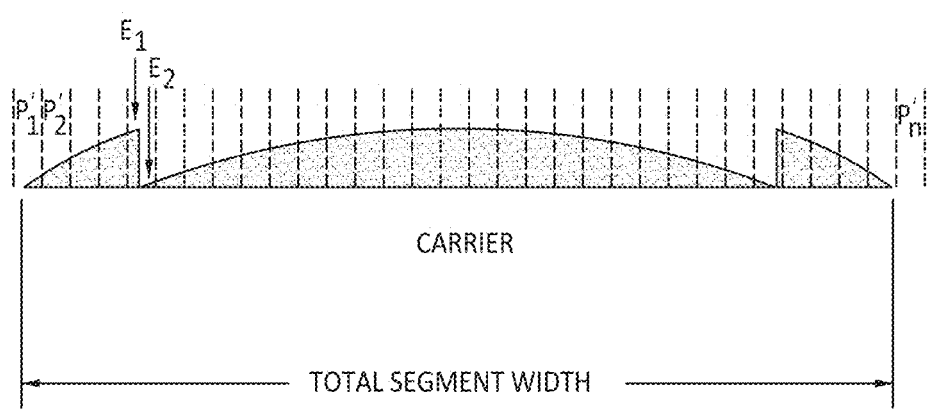
FIG. 1E is another example optical product 10' in accordance with certain embodiments described herein.

FIG. 1E is another example optical product 10' in accordance with certain embodiments described herein. As shown in FIG. 1E, the optical product 10' can include a plurality of portions $P'_1, P'_2, \ldots P'_n$. Each portion $P'_n$ can include elements $E_1, E_2, \ldots E_n$, e.g., non-holographic elements, on the optical product 10'. As described herein, utilizing embodiments of the optical product 10' having elements $E_1, E_2, \ldots E_n$ (or masters having features $F_1, F_2, \ldots F_n$) with smaller height can be advantageous to reduce the amount of material used. However in cases where height is less important, certain embodiments can utilize elements $E_1, E_2, \ldots E_n$ with slowly varying surfaces (e.g., slopes) creating a substantially contiguous surface from one portion $P'_n$ to another. In various embodiments, the number of substantially contiguous portions can include at least two, three, four, five, eight, ten, fifteen, twenty, or more, or be in any range in between these values.

Figure 2:
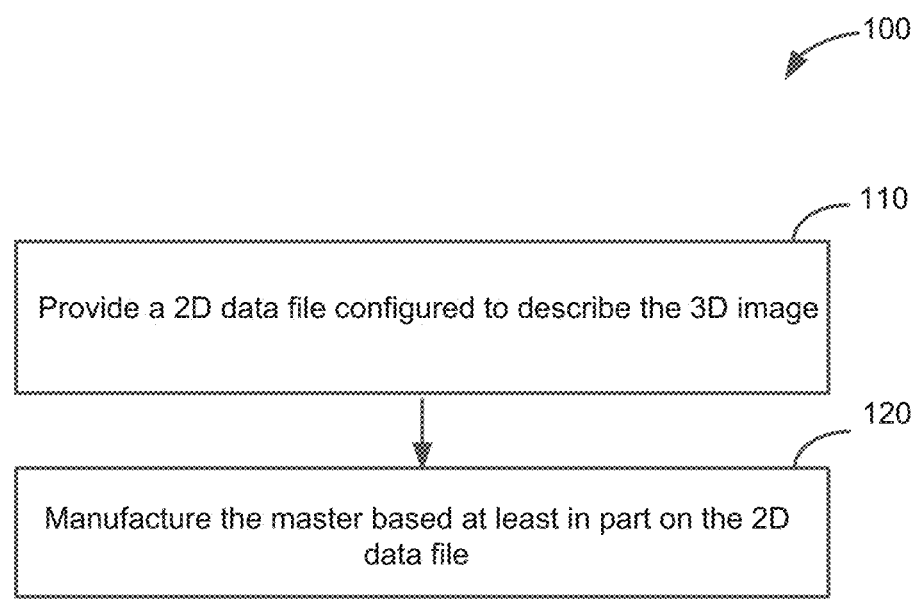
FIG. 2 illustrates an example method to manufacture a master for fabricating an optical product in accordance with certain embodiments described herein.

Various methods can be used to manufacture the master 10 for fabricating an optical product 10'. An example method 100 is shown in FIG. 2. As shown in operational block 110, the method 100 can include providing a data file, e.g., a 2D data file, configured to describe, characterize, and/or record features the 3D object and/or 3D image 50'. The data file can provide the pattern of the features $F_1, F_2, \ldots F_n$ on the surface 12 of the master 10.

For example, the data file can comprise a plurality of portions (as will be described further herein). Each portion can correspond to one or more points on a surface S of the 3D object 50. Each portion can comprise features of intensity corresponding to non-holographic elements on the optical product 10'. A gradient in intensity can correlate to an inclination of the surface S of the 3D object 50 at the one or more corresponding points. In addition, an orientation of the features can correlate to an orientation of the surface S of the 3D object 50 at the one or more corresponding points. As shown in operational block 120, the method 100 can further include manufacturing the master 10 based at least in part on the 2D data file.

Figure 2A:
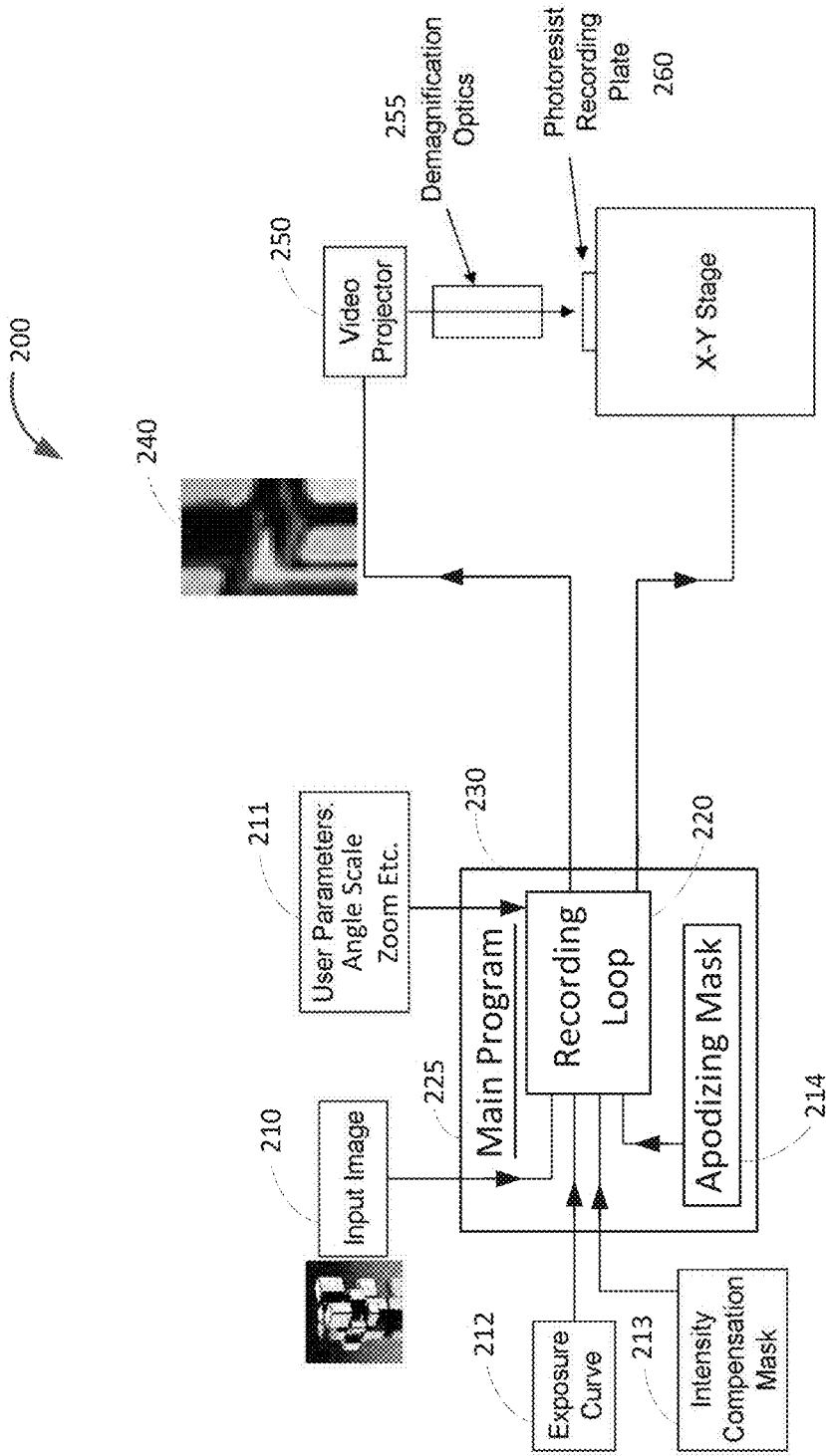
FIG. 2A illustrates an example method that can be used to manufacture a surface relief diffuser.

As described herein, certain embodiments of the optical product 10' can produce a bright, mirror-like image. In some implementations, a matte finish may be desired. FIG. 2A illustrates an example method that can be used to manufacture a surface relief diffuser and also to determine a height displacement file used to manufacture the diffuser. In the method 200 shown in FIG. 2A, an input image 210 of the 3D object 50 (e.g., a 2D photograph of the 3D object) is entered into the recording loop 220 of the main program 225 of the processor 230. Other information, such as user parameters 211 (e.g., angle, scale, zoom, etc.), exposure compensation curve 212, intensity compensation mask 213, and apodizing mask 214 can also be entered into the recording loop 220. The processor 230 can produce a height displacement file 240 that is configured to describe the intensities of the 3D object 50. This height displacement file 240 can be used as a map to generate the pattern of the diffuser. In some examples of the height displacement file 240, the intensities of the 3D object can be correlated to a depth for the diffuser.

For example, the black sections of the 3D object 50 can correlate to the surface of the diffuser, white sections of the 3D object 50 can correlate to a lower depth (e.g., down 10 μm), and grey sections of the 3D object 50 can correlate to some depth in between. Other variations are possible.

In the example method 200 shown in FIG. 2A, a digital micromirror device (DMD) video projector 250 can be used along with the photoresist recording plate 260, each receiving the inputted information from the recording loop 220. The DMD video projector 250 includes a DMD chip that includes a plurality of micromirrors that in certain embodiments can correspond to the pixels of the height displacement file 240. The pixels of the height displacement file 240 can also correspond to the regions on the X-Y stage of the photoresist recording plate 260 in some embodiments. Each micromirror of the DMD chip can be used as a spatial light modulator that, for example, reflects light from a light source in the video projector 250 in the on-state, and that does not reflect light in the off-state. Varying the amount of light intensity can be produced by varying the time the micromirror is in the on- and off-states (e.g., pulse width modulation, etc.). As shown in FIG. 2A, demagnification optics 255 can be used to produce the pattern of the diffuser in a light sensitive material, e.g., a photoresist, on the resist recording plate 260. In some embodiments, the resist can be used as the diffuser. As disclosed herein, other techniques, such as electron beam lithography on electron sensitive material and ion beam lithography on ion sensitive material can also be used. Certain embodiments of the diffuser can be used with certain embodiments of the optical product 10' to produce a diffuse or hazy layer over the reflected image 50' to produce an image with a matte finish.

Figure 2B:
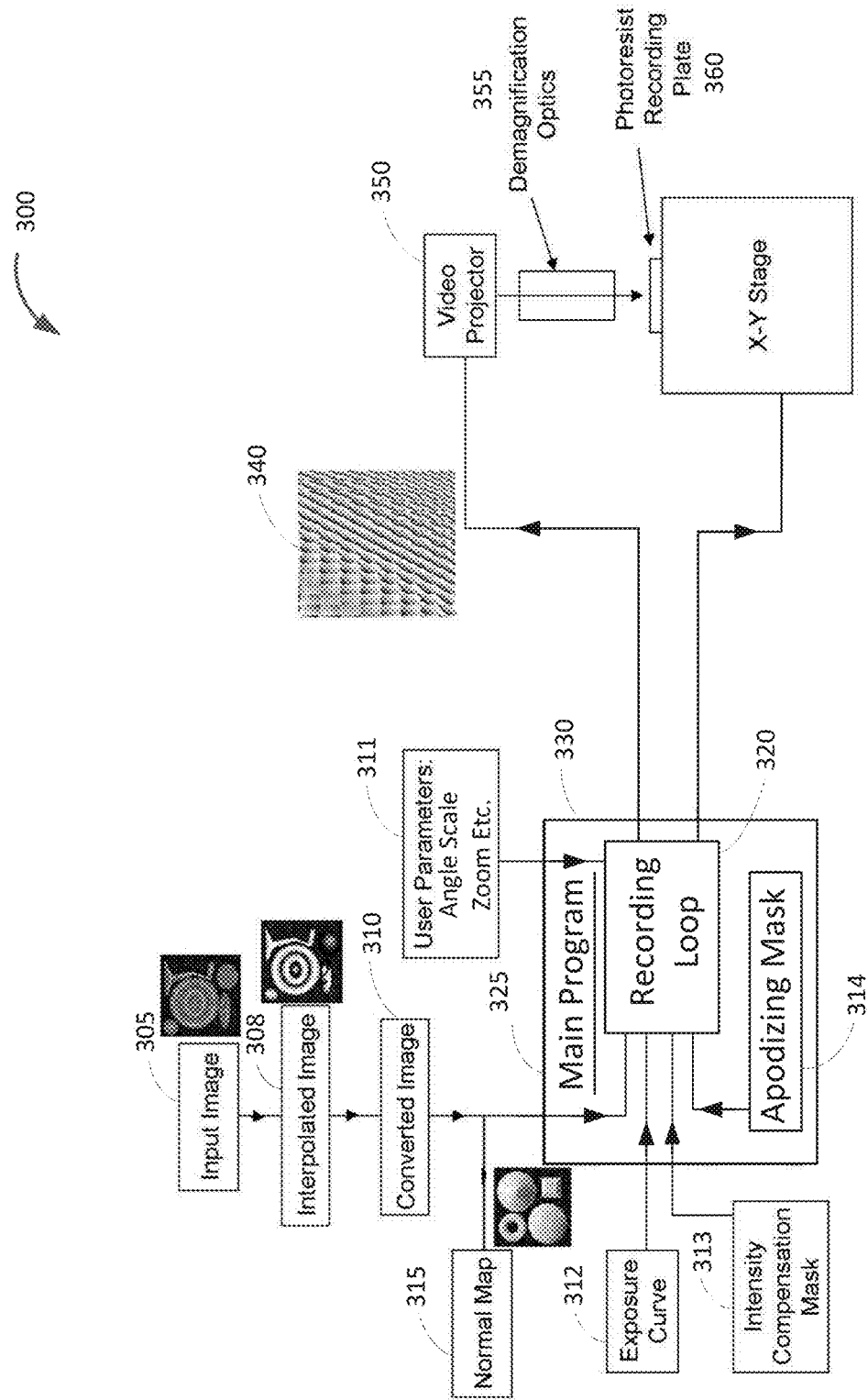
FIGS. 2B-2C illustrate example methods to manufacture a master for fabricating an optical product in accordance with certain embodiments described herein.

FIG. 2B illustrates an example method that can be used to manufacture the master 10 and also to determine the data file to be used to manufacture the master 10, e.g., to determine the pattern of the features $F_1, F_2, \ldots F_n$ on the surface 12 of the master 10. Certain such embodiments can be advantageous as a 3D physical object and/or a 3D model utilizing physical dimensions of the 3D object (e.g., topographical calculations) are not required. For example, in the method 300 shown in FIG. 2B, the input image 305 can be a 2D input image (e.g., a 2D photograph of the 3D object) or 2D image converted from a 3D image. In some embodiments, the input image 305 can be converted into a 2D interpolated image 308 and produced as a 2D converted image 310. The 2D image of the 3D object can be translated into a gray scale image (e.g., a normal map 315 wherein black, white, and gray regions correlate to different heights of the 3D object). In the method 300 shown in FIG. 2B, the converted image 310 (or a normal map 315) is entered into the recording loop 320 of the main program 325 of the processor 330 in accordance with certain embodiments described herein. Similar to the method 200 in FIG. 2A, other information, such as user parameters 311 (e.g., angle, scale, zoom, etc.), exposure compensation curve 312, intensity compensation mask 313, and apodizing mask 314 can also be entered into the recording loop 320. The processor 330 can produce a data file 340, e.g., a 2D data file, that is configured to describe the 3D image 50' of at least a part of the 3D object 50. In some embodiments, the intensities in the data file 340 can be assigned based on gray scale. For example, the data file 340 can comprise a plurality of portions. Each portion can correspond to one or more points on a surface S of the 3D object 50. Each portion can comprise features of intensity corresponding to non-holographic elements on the optical product 10'. A gradient in intensity can correlate to a gradient or an inclination of the surface S of the 3D object 50 at the one or more corresponding points. In addition, an orientation of the features can correlate to an orientation of the surface S of the 3D object 50 at the one or more corresponding points. This data file 340 can be used as a map to generate the pattern of features $F_1, F_2, \ldots F_n$ on the surface 12 of the master 10. An example data file is discussed with respect to FIG. 3A.

Similar to method 200 in FIG. 2A, a digital micromirror device (DMD) video projector 350 can be used along with the photoresist recording plate 360, each receiving the inputted information from the recording loop 320. The plurality of micromirrors in the DMD video projector 350 in certain embodiments can correspond to the pixels of the data file 240. The pixels of the data file 340 can also correspond to one or more portions $P_1, P_2, \ldots P_n$ of the surface 12 of the master 10 in some embodiments. As shown in FIG. 2B, the demagnification optics 355 can be used to produce the pattern of features $F_1, F_2, \ldots F_n$ in a light sensitive material, e.g., a photoresist, on the resist recording plate 360. In some embodiments, the resist can be used as the surface 12 of the master 10. As disclosed herein, other techniques, such as electron beam lithography on electron sensitive material and ion beam lithography on ion sensitive material can also be used.

In some embodiments, the method 300 can further include adding on the master 10 features corresponding to holographic elements on the optical product 10'. For example, an optical recording (e.g., a planar optical recording) for the holographic elements can be superimposed onto the master 10 to add the holographic elements on the master 10. As another example, in some embodiments, the data file 340 can include features corresponding to holographic elements on the optical product 10'. In other embodiments, a separate data file comprising the features of intensity corresponding to holographic elements on the optical product 10' can be provided. Manufacturing the master 10 can be based at least in part on the data file 340 including features corresponding to non-holographic elements and on the data file including features corresponding to holographic elements on. In some such embodiments, the data file 340 including the features corresponding to non-holographic elements and the data file including the features corresponding to holographic elements can be used sequentially or simultaneously to manufacture the master 10. In some other embodiments, a needle, such as from an atomic force microscope, can be used to produce the features corresponding to the holographic elements on the optical product 10'. Other methods can be employed to add holographic features or elements.

Figure 2C:
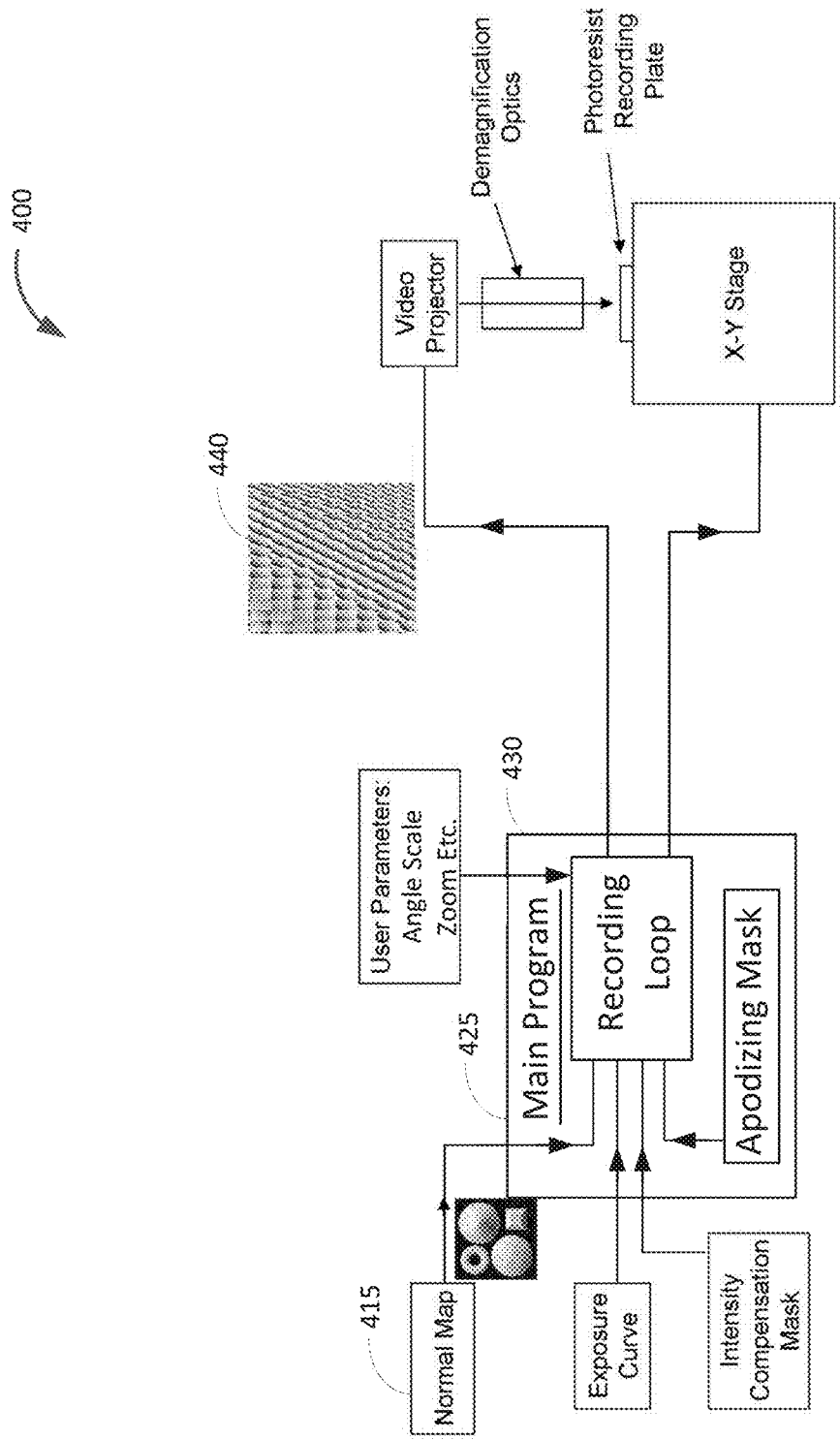

FIG. 2C illustrates yet another example method that can be used to determine the pattern of the features $F_1, F_2, \ldots F_n$ on the surface 12 of the master 10. The method 400 shown in FIG. 2C is similar to the method 300 shown in FIG. 2B except that a normal map 415 can be provided instead of the input image 310. The normal map 415 can be inputted into the main program 425 of the processor 430 to produce the data file 440.

Figure 3A:
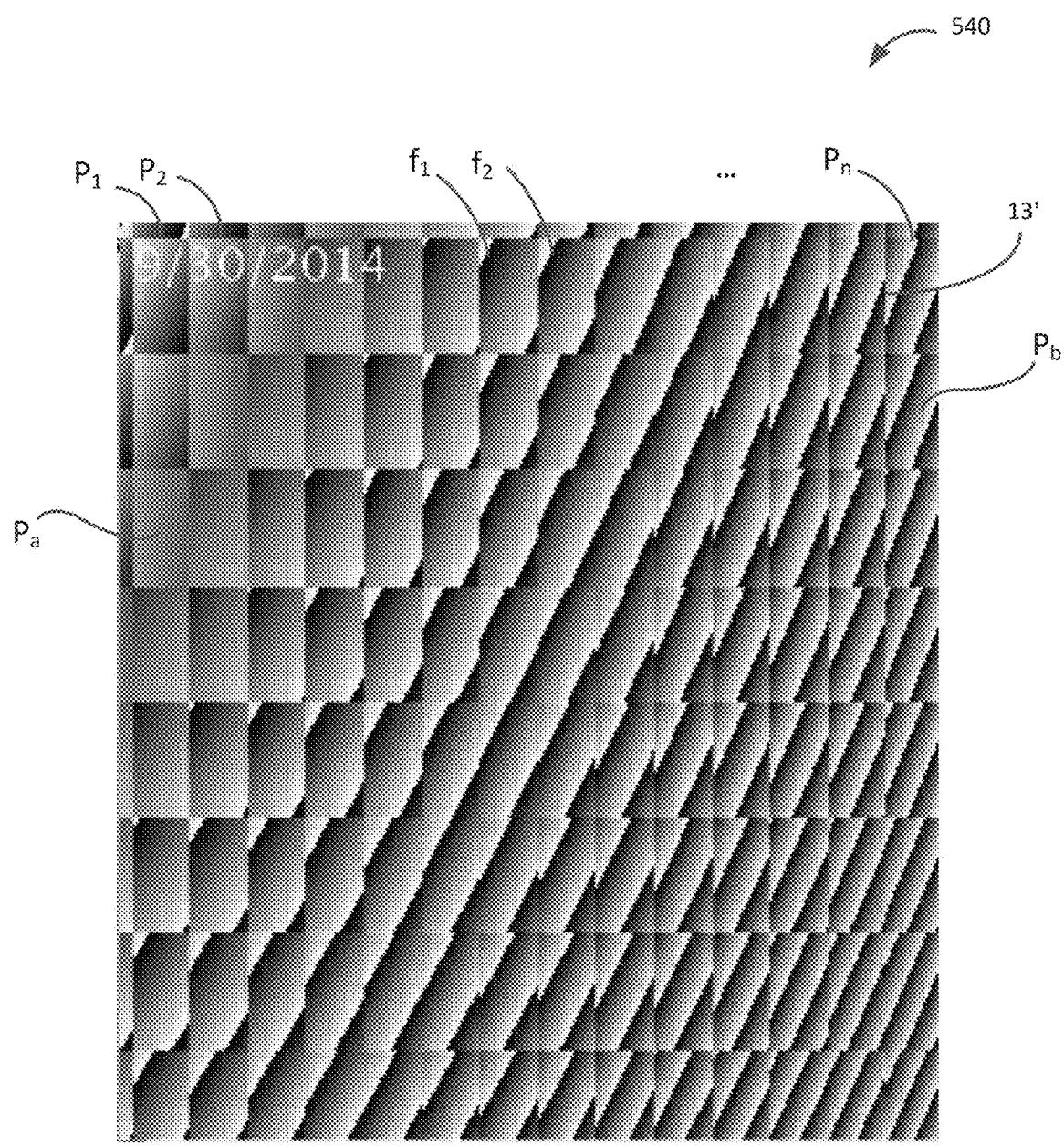
FIGS. 3A-3B illustrate example 2D data files in accordance with certain embodiments disclosed herein.

FIG. 3A illustrates an example 2D data file 540 in accordance with certain embodiments disclosed herein. The data file 540 can include a plurality of portions $p_1, p_2, \ldots p_n$. In some embodiments, the plurality of portions $p_1, p_2, \ldots p_n$ can form a single cell (e.g., a mono-cell). In other embodiments, as shown in FIG. 3A, the plurality of portions $p_1, p_2, \ldots p_n$ can form a plurality of cells. In various embodiments, the portions $p_1, p_2, \ldots p_n$ can form a pixelated surface corresponding to the portions $P_1, P_2, \ldots P_n$ of the surface 12 of the master 10. For example, as shown in FIG. 3A, the portions $p_1, p_2, \ldots p_n$ can include a plurality of rows and columns.

Figure 3B:
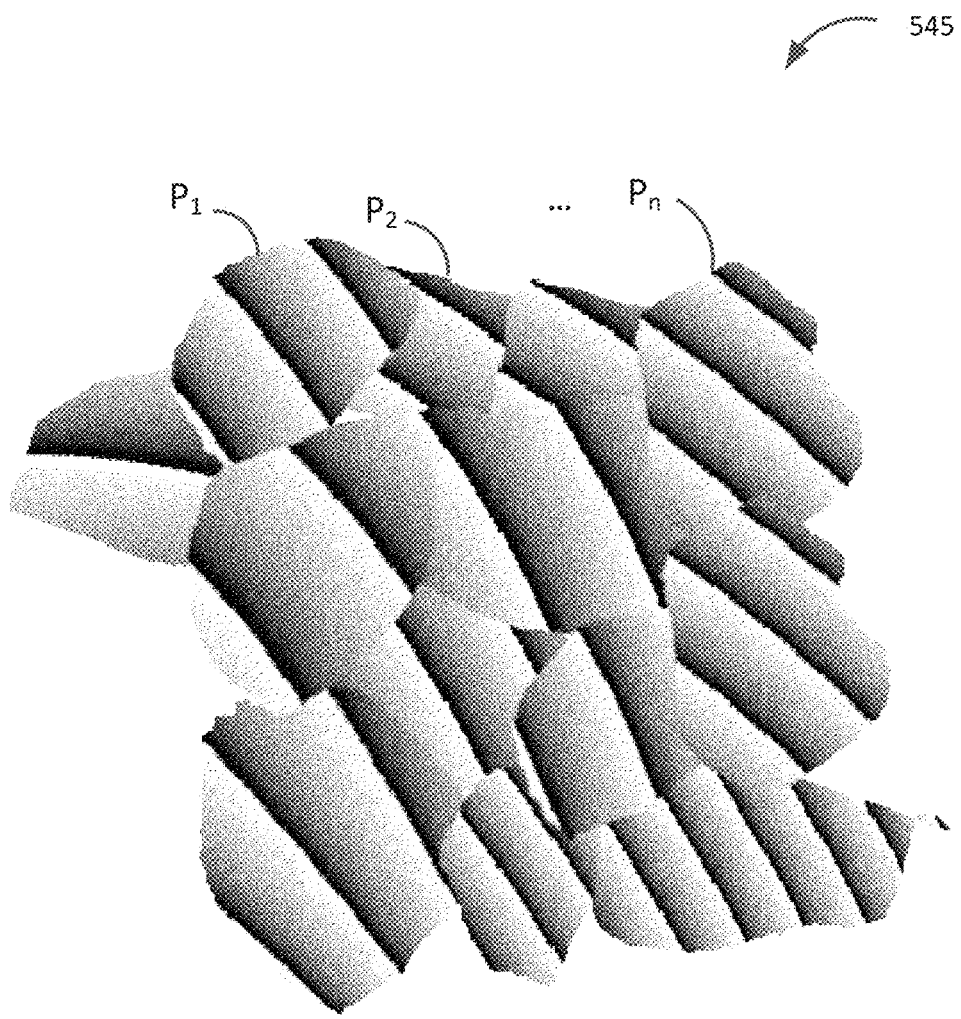

As also shown in FIG. 3A, in some embodiments, borders 13' can surround at least part of the portions $p_1, p_2, \ldots p_n$. The borders 13' can substantially surround a portion $p_n$, or can surround just part of a portion $p_n$. As with the master 10, the size and shape of the portions $p_1, p_2, \ldots p_n$ on the data file 540 are not particularly limited. Some of the portions $p_1, p_2, \ldots P_n$ can comprise a symmetrical shape. For example, the symmetrical shape can include a rectangle, a square, a rhombus, an equilateral triangle, an isosceles triangle, a regular polygon (e.g., a regular pentagon, a regular hexagon, a regular octagon), etc. The shape can also include curvature, e.g., a circle, an ellipse, etc. In other embodiments, some of the portions $p_1, p_2, \ldots P_n$ can comprise a non-symmetrical shape, e.g., a non-rotationally symmetrical shape, and/or an irregular shape. For example, FIG. 3B illustrates an example embodiment of a data file 545 with irregularly shaped portions $p_1, p_2, \ldots p_n$. In some embodiments, some of the portions $p_1, p_2, \ldots p_n$ can have a shape that is substantially the same as other portions $p_1, P_2, \ldots p_n$. In other embodiments, e.g., as shown in FIG. 3B, some of the portions $p_1, p_2, \ldots p_n$ can have a shape that is different from other portions $p_1, p_2, \ldots p_n$.

As with the master 10, the arrangement of the portions $p_1, p_2, \ldots p_n$ in the data file 540 is not particularly limited. For example, whether with or without borders, whether symmetrically shaped or non-symmetrically shaped, or whether regularly or irregularly shaped, the portions $p_1, p_2, \ldots p_n$ can form a periodic array. For example, in FIG. 3A, the portions $p_1, p_2, \ldots p_n$ form a periodic array. In other embodiments, whether with or without borders, whether symmetrically shaped or non-symmetrically shaped, or whether regularly or irregularly shaped, the portions $p_1, p_2, \ldots p_n$ can form an aperiodic array. For example, in FIG. 3B, the portions $p_1, p_2, \ldots p_n$ form an aperiodic array. In yet other embodiments, the portions $p_1, p_2, \ldots p_n$ can form a combination of periodic and aperiodic arrays.

With continued reference to FIG. 3A, each portion $p_n$ can include features $f_1, f_2, \ldots f_n$ that correspond to features $F_1, F_2, \ldots F_n$ on the surface 12 of the master 10. Portion $p_a$ has a single feature $f_1$, while portion $p_b$ has multiple features $f_n$. The features $f_1, f_2, \ldots f_n$ of the data file 540 can include features of intensity (varying dark and light lines). In some embodiments, the intensity can correlate to the height of a feature on the surface S of the 3D object 50.

In various embodiments, a lateral distance between two features can be defined in some embodiments as a pitch. In some embodiments, the pitch between features within a portion $p_n$ can be substantially the same within the portion $p_n$. For example, in various embodiments, in portion $p_1$ of the portions $p_1, p_2, \ldots p_n$, the feature $f_1$ can comprise a plurality of features that form a periodic array such that the pitch is substantially the same within portion $p_1$. In addition, in some embodiments, the features $f_1, f_2, \ldots f_n$ among multiple portions $p_1, p_2, \ldots p_n$, can form a periodic array such that the pitch is substantially the same among multiple portions $p_1, p_2, \ldots p_n$.

In other embodiments, the features can form an aperiodic array such that the pitch may be different among multiple portions $p_1, p_2, \ldots p_n$. However, although the pitch may be different for different portions $p_1, p_2, \ldots P_n$, in some embodiments, the pitch can be slowly varying (e.g., less than 15% change per lateral distance, less than 12% change per lateral distance, less than 10% change per lateral distance, less than 8% change per lateral distance, less than 5% change per lateral distance, less than 3% change per lateral distance, or less than 1% change per lateral distance) among the portions $p_1, p_2, \ldots p_n$. In some embodiments, the pitch may uniformly change across multiple portions $p_1, p_2, \ldots p_n$.

In other embodiments, the features could be chirped within a portion $p_n$ such that the pitch may be different within the portion $p_n$. In some such embodiments, the pitch within the portion $p_n$ may slowly vary (e.g., less than 15% change per lateral distance, less than 12% change per lateral distance, less than 10% change per lateral distance, less than 8% change per lateral distance, less than 5% change per lateral distance, less than 3% change per lateral distance, or less than 1% change per lateral distance).

FIG. 3A shows an example data file 540 with linear features where the pitch is substantially uniform within a portion $P_n$, and FIG. 3B shows an example data file 545 with curved features where the pitch is substantially uniform within a portion $p_n$. FIG. 3A is also an example of features having a pitch that slowly changes (e.g., less than 10% change per lateral distance) across multiple portions $p_1, p_2, \ldots p_n$.

In various embodiments, each feature of intensity can include a slope. Various embodiments can advantageously have a uniform gradient (e.g., uniform slope) within each portion $p_n$ such that the gradient is a single value (e.g., a single polar angle $\theta_n$) at the corresponding point $S_n$ on the surface S of the 3D object 50. The gradient in the features $f_1, f_2, \ldots f_n$ can correlate to an inclination of the surface S of the 3D object 50 at the corresponding point $S_1, S_2, \ldots S_n$. In other embodiments, the feature $f_n$ within a portion $p_n$ includes a plurality of features, and the features within the portion $p_n$ may have more than one gradient (e.g., different slopes). In such embodiments, the average gradient (e.g., average slope) of the features within the portion $p_n$ can correlate to the inclination of the surface S of the 3D object 50 at the corresponding point $S_n$.

Various embodiments can also advantageously have a uniform orientation within each portion $p_n$, such that the orientation is a single value (e.g., a single azimuth angle $\varphi_n$) at the corresponding point $S_n$ on the surface S of the 3D object 50. In various embodiments, the orientation of features $f_1, f_2, \ldots f_n$ can correlate to an orientation of the surface S of the 3D object 50 at the corresponding point $S_1, S_2, \ldots S_n$. In other embodiments, the feature $f_n$ within a portion $p_n$ includes a plurality of features, and the features within the portion $p_n$ may have more than one orientation (e.g., different orientations). In such embodiments, the average orientation of the features within the portion $p_n$ can correlate to the orientation of the surface S of the 3D object 50 at the corresponding point $S_n$. Furthermore, the orientation of the features within and among the portions $p_1, p_2, \ldots P_n$, can slowly vary (e.g., less than 15% change per lateral distance, less than 12% change per lateral distance, less than 10% change per lateral distance, less than 8% change per lateral distance, less than 5% change per lateral distance, less than 3% change per lateral distance, or less than 1% change per lateral distance) within and among the portions $p_1, p_2, \ldots p_n$.

In some embodiments, where a feature $f_1$ includes multiple features within a portion, the features can appear discontinuous with other features within the portion. In some embodiments where the surface 12 of the master 10 is pixelated (e.g., having a plurality of cells), the features $f_1, f_2, \ldots f_n$ can appear discontinuous with features in surrounding adjacent portions. Based on pixel or cell size and/or tolerances in creating the data file 540, some embodiments may include random discontinuities with substantially no (relatively little if any) negative impact in image reproduction. Such discontinuity can reduce iridescence. In other embodiments, the portions $p_1, p_2, \ldots p_n$ can form a single cell or a mono-cell. In some such embodiments, the features $f_1, f_2, \ldots f_n$ can appear continuous and smoothly varying depending on the shape. In other such embodiments, the features $f_1, f_2, \ldots f_n$ can appear discontinuous due to discontinuities in the 3D object 50.

Figure 3C:
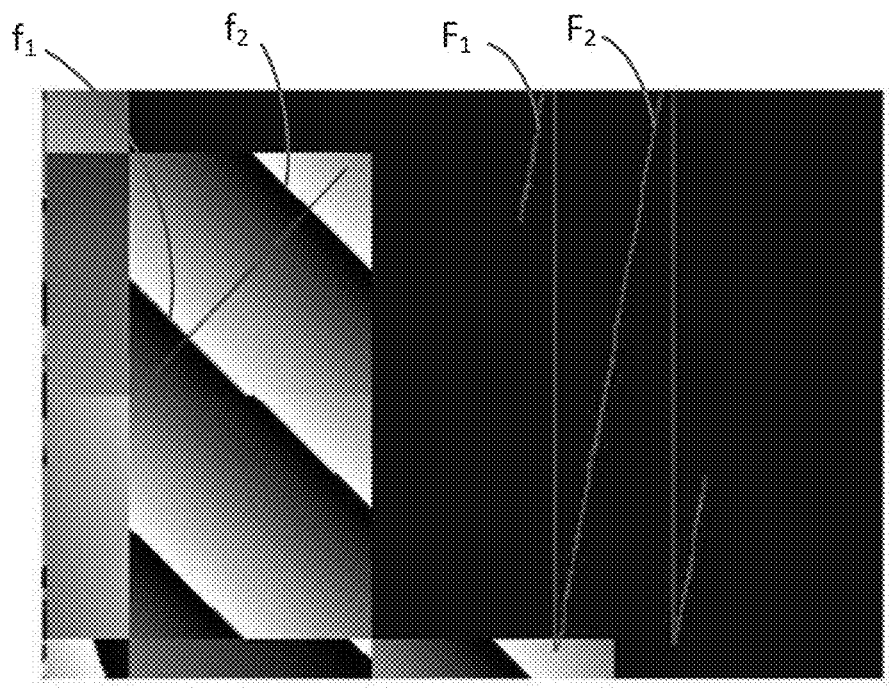
FIGS. 3C-3D illustrate example features on a data file and the corresponding features on the surface of a master for fabricating an optical product in accordance with certain embodiments disclosed herein.

In some embodiments, as shown in FIG. 3C, the features $f_1, f_2, \ldots f_n$ can comprise linear features corresponding to a substantially smooth region of the surface S of the 3D object 50. The features $f_1, f_2, \ldots f_n$ can be used to produce linear features $F_1, F_2, \ldots F_n$ on the surface 12 of the master 10. The features $f_1, f_2, \ldots f_n$ can also be used to produce non-linear features $F_1, F_2, \ldots F_n$ on the surface 12 of the master 10. In some embodiments, features $f_1, f_2, \ldots f_n$ that are linear can be used to correspond to a curved region of the surface S of the 3D object 50. In some such embodiments, linear features $f_1, f_2, \ldots f_n$ in the data file can be used to represent a curved region by using a piecewise approximation function.

Figure 3D:
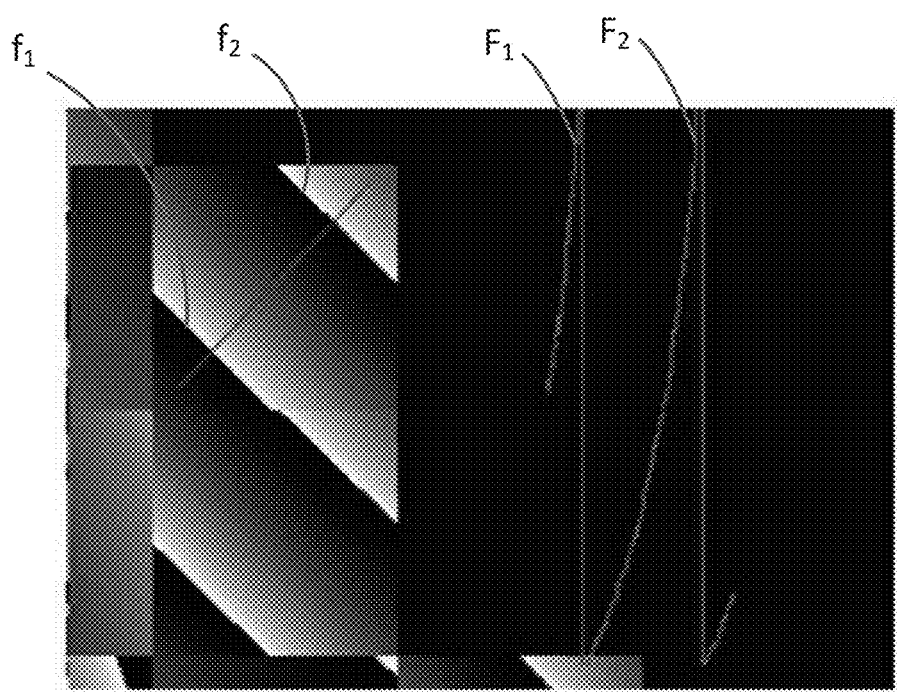

As shown in FIG. 3D, in some embodiments, although linear features $f_1, f_2, \ldots f_n$ in the data file can correspond to a substantially smooth region of the surface S of the 3D object 50, non-linear features on the master 10 (e.g., curved facets shown in left profile) can be used. As described herein, in some such embodiments, non-linear features on the master 10 can be used to produce elements $E_1, E_2, \ldots E_n$ on an optical product 10' that can appear smooth because the corresponding features on the optical product 10' can be relatively small (e.g., between 1 μm and 100 μm, between 1 μm and 75 μm, between 1 μm and 50 μm, or between 1 μm and 25 μm).

As the features $f_1, f_2, \ldots f_n$ of the data file 540 correspond to aspects of the surface S of the 3D object 50, the features $f_1, f_2, \ldots f_n$ of the data file 540 can be used to produce the features $F_1, F_2, \ldots F_n$ on the surface 12 of the master 10. As described herein, the features $F_1, F_2, \ldots F_n$ on the surface 12 of the master 10 can be used to fabricate the elements $E_1, E_2, \ldots E_n$ on the surface 12' of the optical product 10'. As described herein, in various embodiments, the elements $E_1, E_2, \ldots E_n$ on the optical product 10' can be non-holographic. For example, the elements $E_1, E_2, \ldots E_n$ do not need to rely on holography to render a 3D image 50' of the 3D object 50.

Figure 4A:
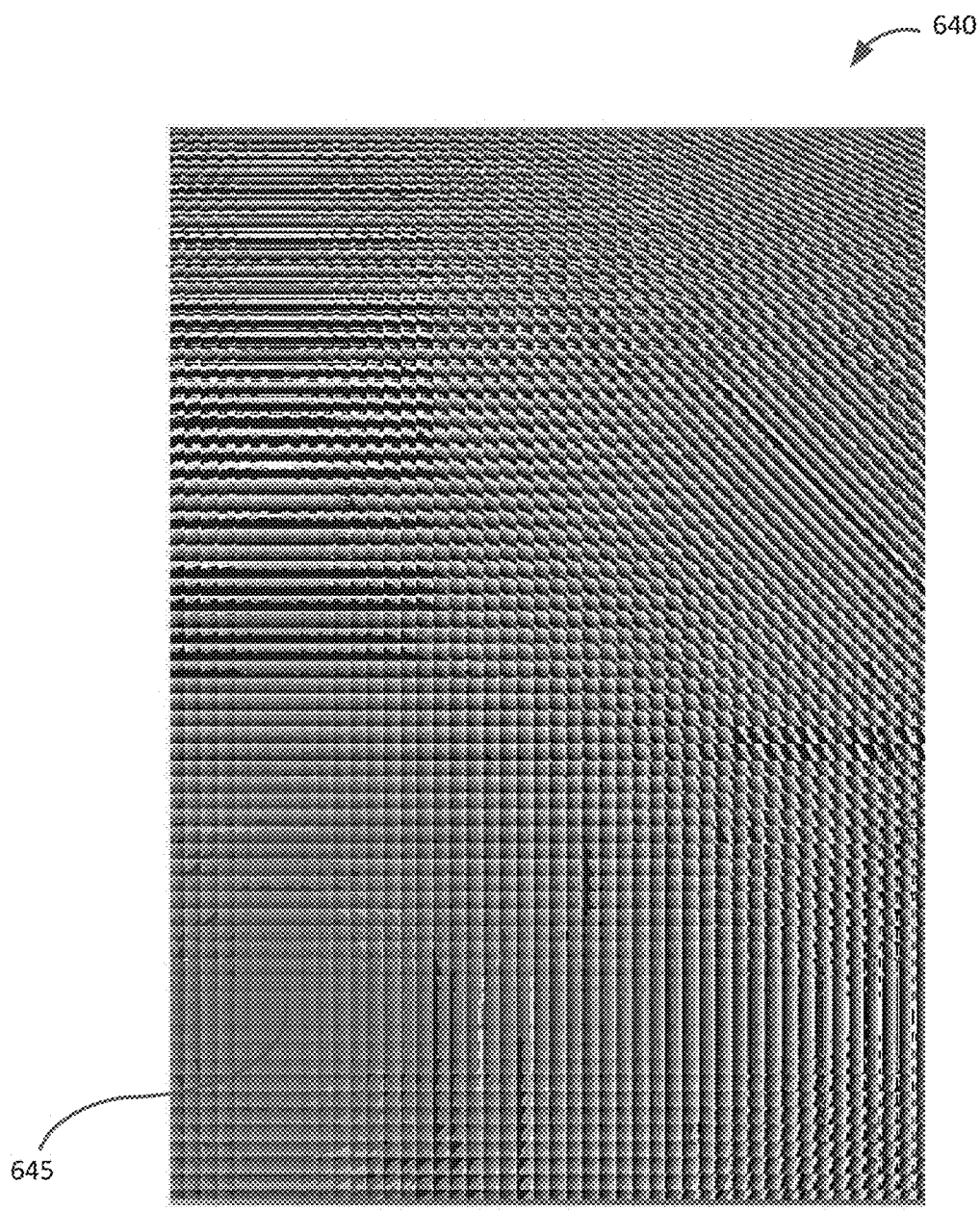
FIG. 4A illustrates another example 2D data file in accordance with certain embodiments disclosed herein.
Figure 4B:
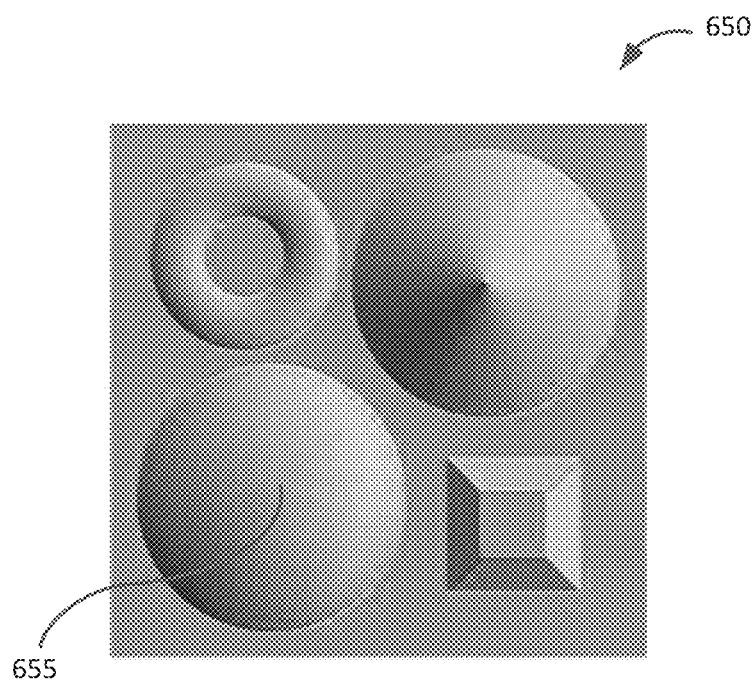
FIG. 4B illustrates an example normal map used to generate the data file shown in FIG. 4A.
Figure 4C:
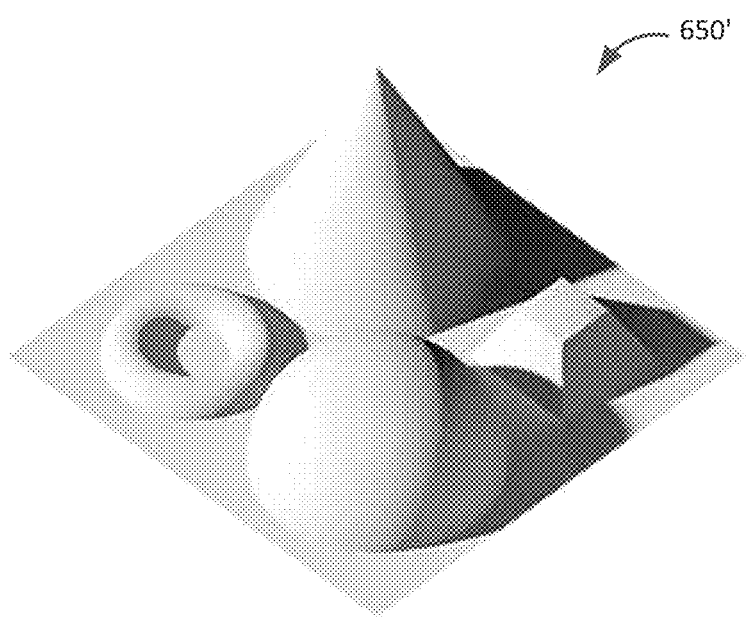
FIG. 4C illustrates the 3D image reproduced by an optical product generated from a master produced using the data file shown in FIG. 4A.

FIG. 4A is another example 2D data file 640 prepared in accordance with certain embodiments described herein. The data file 640 was generated by the normal map 650 shown in FIG. 4B. As an example, the lower left portion 645 of the data file 640 represents the center of the hemispherical object 655 in the lower left portion of the normal map 650. The data file 640 was used to generate the features $F_1, F_2, \ldots F_n$ on the surface 12 of a master 10, which was used to fabricate the elements $E_1, E_2, \ldots E_n$ on the surface 12' of an optical product 10'. The optical product 10' was configured, when illuminated, to reproduce by reflected light, the 3D image 650' shown in FIG. 4C.

In certain embodiments, an optical product 10' is also disclosed herein. As described herein, the optical product 10' can be configured, when illuminated, to reproduce by reflected light, a 3D image 50' of at least a part of a 3D object 50. As shown in FIG. 1A, similar to the master 10, the optical product 10' can include a surface 12' comprising a plurality of portions $P'_1, P'_2, \ldots P'_n$. Each portion $P'_n$ can correspond to a point $S_n$ on a surface S of the 3D object 50. Each portion $P'_n$ can comprise features, e.g., non-holographic elements $E_1, E_2, \ldots E_n$. In certain embodiments, the non-holographic elements $E_1, E_2, \ldots E_n$ can be configured to produce at least part of the 3D image 50' without relying on diffraction. In various embodiments, the portions $P'_1, P'_2, \ldots P'_n$ can form a single cell (e.g., a mono-cell). In other embodiments, the portions $P'_1, P'_2, \ldots P'_n$ can form a plurality of cells. Each portion $P'_n$ can form a cell of the plurality of cells. The optical product 10' can include borders surrounding at least part of the portions $P'_1, P'_2, \ldots P'_n$.

A gradient (e.g., uniform slope or average slope) in the non-holographic features $E_1, E_2, \ldots E_n$ can correlate to an inclination of the surface S of the 3D object 50 at the corresponding point $S_1, S_2, \ldots S_n$. In addition, the orientation (e.g., uniform orientation or average orientation) of the non-holographic features $E_1, E_2, \ldots E_n$ can correlate to an orientation of the surface S of the 3D object 50 at the corresponding point $S_1, S_2, \ldots S_n$.

Furthermore, since the master 10 can be used to fabricate an optical product 10', aspects disclosed herein with reference to the master 10 can apply to certain embodiments of the optical product 10'. For example, disclosure with respect to the shapes (e.g., symmetrical, non-symmetrical, irregular, curved, etc.) and arrangements (e.g., periodic, aperiodic, etc.) of the portions $P_1, P_2, \ldots P_n$ for the master 10 can apply to the shapes and arrangements of the portions $P'_1, P'_2, \ldots P'_n$ of the optical product 10'. As another example, disclosure with respect to the features $F_1, F_2, \ldots F_n$ (e.g., linear, curved, periodic, aperiodic, slowly varying, continuous, discontinuous, non-sinusoidal, etc.) for the master 10 can apply to the features $E_1, E_2, \ldots E_n$ of the optical product 10'. Furthermore, as described herein with respect to the master and the method of manufacturing the master, the optical product 10' of certain embodiments can further comprise features corresponding to holographic features.

In addition, small features can be imbedded in the optical product 10' that do not contribute to the formation of the image. Such imbedded features can be used in authenticity and security applications. Furthermore, as described herein, certain embodiments can incorporate intentional variations within one or more portions $P'_1, P'_2, \ldots P'_n$ of the optical product 10' for security applications.

The terms "about" and "substantially" as used herein represent an amount equal to or close to the stated amount (e.g., an amount that still performs a desired function or achieves a desired result). For example, unless otherwise stated, the terms "about" and "substantially" may refer to an amount that is within (e.g., above or below) 10% of, within (e.g., above or below) 5% of, within (e.g., above or below) 1% of, within (e.g., above or below) 0.1% of, or within (e.g., above or below) 0.01% of the stated amount.

Various embodiments of the present invention have been described herein. Although this invention has been described with reference to these specific embodiments, the descriptions are intended to be illustrative of the invention and are not intended to be limiting. Various modifications and applications may occur to those skilled in the art without departing from the true spirit and scope of the invention.

What is claimed is:

1. An optical product configured, when illuminated, to reproduce by reflected light, an image that appears 3D of at least a part of a 3D object, said optical product comprising:
   a first surface; and
   a second surface opposite said first surface, said second surface comprising a plurality of portions, each portion corresponding to a point on a surface of said 3D object, each portion comprising one or more non-holographic features configured to produce at least part of said image without relying on diffraction (1) at viewing angles through about 20 degrees to about 160 degrees relative to a plane of the optical product as the optical product is tilted and (2) at viewing angles through about 20 degrees to about 90 degrees relative to the plane of the optical product as the optical product is rotated at least throughout the range of about 90 degrees in the plane of the optical product, at least one of said one or more non-holographic features comprising a curved feature with a reflective coating such that the optical product, when illuminated, reproduces by reflected light, the image that appears 3D,
   wherein for individual ones of the portions, a gradient in said non-holographic features correlates to a surface normal of said surface of said 3D object at said corresponding point,
   wherein for individual ones of the portions, an orientation of said non-holographic features correlates to an orientation of said surface of said 3D object at said corresponding point, and
   wherein the portions are configured to mix a plurality of colors together to form white light.

2. The optical product of claim 1, wherein the viewing angles are through about 15 degrees to about 165 degrees relative to the plane of the optical product as the optical product is tilted.

3. The optical product of claim 2, wherein the viewing angles are through about 10 degrees to about 170 degrees relative to the plane of the optical product as the optical product is tilted.

4. The optical product of claim 3, wherein the viewing angles are through about 5 degrees to about 175 degrees relative to the plane of the optical product as the optical product is tilted.

5. The optical product of claim 4, wherein the viewing angles are through about 0 degrees to about 180 degrees relative to the plane of the optical product as the optical product is tilted.

6. The optical product of claim 1, wherein the viewing angles are through about 15 degrees to about 90 degrees relative to the plane of the optical product as the optical product is rotated at least throughout the range of about 90 degrees in the plane of the optical product.

7. The optical product of claim 6, wherein the viewing angles are through about 10 degrees to about 90 degrees relative to the plane of the optical product as the optical product is rotated at least throughout the range of about 90 degrees in the plane of the optical product.

8. The optical product of claim 7, wherein the viewing angles are through about 5 degrees to about 90 degrees relative to the plane of the optical product as the optical product is rotated at least throughout the range of about 90 degrees in the plane of the optical product.

9. The optical product of claim 8, wherein the viewing angles are through about 0 degrees to about 90 degrees relative to the plane of the optical product as the optical product is rotated at least throughout the range of about 90 degrees in the plane of the optical product.

10. The optical product of claim 1, wherein said optical product is configured to provide authenticity verification on an item for security.

11. The optical product of claim 10, wherein said item is currency, a credit card, a debit card, a passport, a driver's license, an identification card, a document, a tamper evident container or packaging, or a bottle of pharmaceuticals.

12. The optical product of claim 10, wherein the optical product is an embedded feature, a laminated feature, a hot stamp feature, windowed thread feature, or a transparent window feature.

13. The optical product of claim 1, wherein said 3D object comprises an irregularly shaped object.

14. The optical product of claim 1, wherein said 3D object comprises one or more alphanumeric characters.

15. The optical product of claim 1, wherein said non-holographic features comprise facets.

16. The optical product of claim 15, wherein said non-holographic features comprise linear or curved facets.

17. The optical product of claim 15, wherein said non-holographic features comprise saw tooth shaped features.

18. The optical product of claim 1, wherein said non-holographic features reproduce said image by specularly reflecting light.

19. The optical product of claim 1, wherein said non-holographic features with less steep slopes are configured to reflect light toward an observer's eye, and wherein said non-holographic features with steeper slopes are configured to reflect light away from the observer's eye.

20. The optical product of claim 1, wherein said image is not scaled up in size.

21. The optical product of claim 1, wherein said first surface opposite said second surface is planar.

22. The optical product of claim 1, wherein said optical product is a thin film.

23. The optical product of claim 1, wherein said second surface has a shape different from said 3D object.

24. The optical product of claim 1, wherein said portions form at least a 4×4 array of rows and columns.

25. The optical product of claim 1, wherein said portions comprise from 10 to 20 portions.

26. The optical product of claim 25, wherein a majority of said portions comprises non-holographic features with discontinuities.

27. The optical product of claim 1, wherein a majority of said portions comprises non-holographic features with discontinuities.

28. The optical product of claim 1, wherein said portions are defined by borders.

29. The optical product of claim 28, wherein said portions are defined by linear borders.

30. The optical product of claim 1, wherein a majority of said portions comprise features discontinuous with features in surrounding adjacent portions.

31. The optical product of claim 1, wherein a majority of said features are discontinuous at linear boundaries between adjacent portions.

32. The optical product of claim 1, wherein said portions comprise non-holographic features with discontinuities corresponding to a continuous region of said 3D object.

33. The optical product of claim 1, wherein said one or more non-holographic features are configured to produce at least part of said image without relying on diffraction at viewing angles through about 20 degrees to about 90 degrees relative to the plane of the optical product as the optical product is rotated at least throughout the range of about 180 degrees in the plane of the optical product.

34. The optical product of claim 1, wherein said one or more non-holographic features are configured to produce at least part of said image without relying on diffraction at viewing angles through about 20 degrees to about 90 degrees relative to the plane of the optical product as the optical product is rotated at least throughout the range of about 270 degrees in the plane of the optical product.

35. The optical product of claim 1, wherein said one or more non-holographic features are configured to produce at least part of said image without relying on diffraction at viewing angles through about 20 degrees to about 90 degrees relative to the plane of the optical product as the optical product is rotated at least throughout the range of about 360 degrees in the plane of the optical product.

36. The optical product of claim 1, wherein said second surface further comprises holographic features.

37. The optical product of claim 1, wherein the portions have a length and width between 35 μm and 55 μm.

38. The optical product of claim 37, wherein the portions have a length and width between 40 μm and 50 μm.

* * * * *